(12) United States Patent
Nahum et al.

(10) Patent No.: US 10,171,725 B1
(45) Date of Patent: Jan. 1, 2019

(54) VARIABLE FOCAL LENGTH LENS SYSTEM INCLUDING A FOCUS STATE REFERENCE SUBSYSTEM

(71) Applicant: Mitutoyo Corporation, Kanagawa-ken (JP)

(72) Inventors: Michael Nahum, Kirkland, WA (US); Robert Kamil Bryll, Bothell, WA (US); Paul Gerard Gladnick, Seattle, WA (US)

(73) Assignee: Mitutoyo Corporation, Kanagawa-ken (JP)

( * ) Notice: Subject to any disclaimer, the term of this patent is extended or adjusted under 35 U.S.C. 154(b) by 0 days.

(21) Appl. No.: 15/850,149

(22) Filed: Dec. 21, 2017

(51) Int. Cl.
*H04N 5/232* (2006.01)
*H04N 5/225* (2006.01)
*H04N 5/235* (2006.01)
*G03B 13/36* (2006.01)

(52) U.S. Cl.
CPC ......... *H04N 5/23212* (2013.01); *G03B 13/36* (2013.01); *H04N 5/2256* (2013.01); *H04N 5/2353* (2013.01)

(58) Field of Classification Search
CPC ............. H04N 5/23212; H04N 5/2256; H04N 5/2353; G03B 13/36; G02B 7/28
See application file for complete search history.

(56) References Cited

U.S. PATENT DOCUMENTS

| | | | |
|---|---|---|---|
| 6,542,180 B1 | 4/2003 | Wasserman et al. | |
| 7,030,351 B2 | 4/2006 | Wasserman et al. | |
| 7,324,682 B2 | 1/2008 | Wasserman | |
| 7,454,053 B2 | 11/2008 | Bryll et al. | |
| 7,570,795 B2 | 8/2009 | Yu et al. | |
| 7,627,162 B2 | 12/2009 | Blanford et al. | |
| 8,111,905 B2 | 2/2012 | Campbell | |
| 8,111,938 B2 | 2/2012 | Bryll et al. | |
| 9,143,674 B2 | 9/2015 | Gladnick | |
| 2017/0324895 A1* | 11/2017 | Bryll | ............ G06T 7/0004 |

OTHER PUBLICATIONS

Mermillod-Blondin et al., "High-speed varifocal imaging with a tunable acoustic gradient index of refraction lens," *Opt. Lett.* 33(18): 2146-2148, 2008.
"QVPAK 3D CNC Vision Measuring Machine: User's Guide," Version 7.0, Manual No. 99MCB225A, Series No. 359, 1st ed., Mitutoyo Corporation & Micro Encoder Inc., Jan. 2003, 329 paaes.

* cited by examiner

*Primary Examiner* — Nelson D. Hernández Hernández
(74) *Attorney, Agent, or Firm* — Seed IP Law Group LLP

(57) ABSTRACT

A focus state reference subsystem comprising a focus state reference object (FSRO) and reference object optics (ROO) is for use in a variable focal length (VFL) lens system comprising a VFL lens, a controller that modulates its optical power, and a camera located along an imaging path including an objective lens and the VFL lens. The ROO transmits image light from the FSRO along a portion of the imaging path through the VFL lens to the camera. Respective FS reference regions (FSRRs) of the FSRO include a contrast pattern fixed at respective focus positions relative to the ROO. A camera image that includes a best-focus image of a particular FSRR defines a best-focus reference state associated with that FSRR, wherein that best-focus reference state comprises a VFL optical power and/or effective focus position of the VFL lens system through the objective lens.

19 Claims, 9 Drawing Sheets

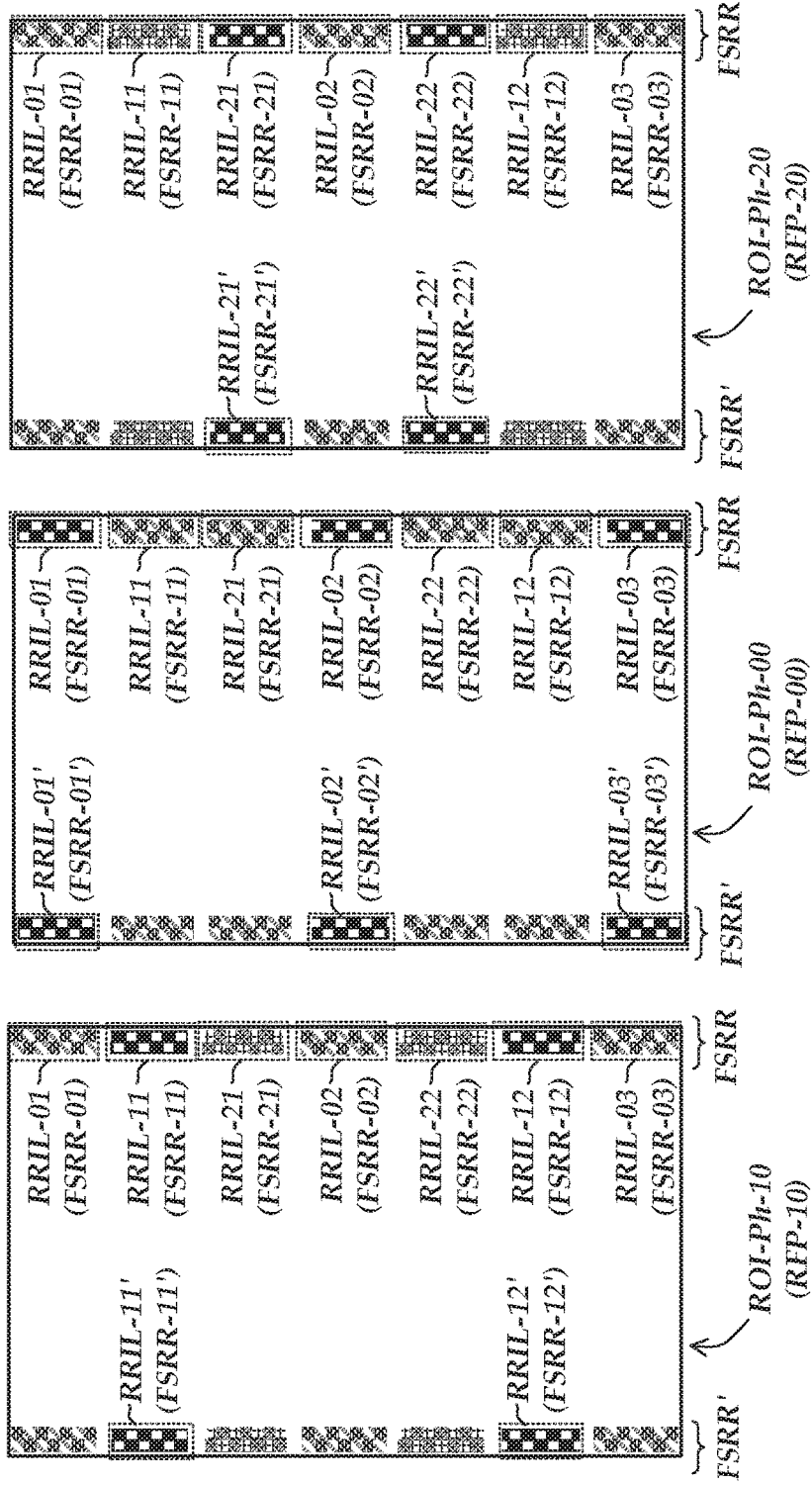

VARIABLE FOCAL LENGTH LENS SYSTEM INCLUDING A FOCUS STATE REFERENCE SUBSYSTEM

BACKGROUND

Technical Field

This disclosure relates to precision metrology using a high speed variable focal length (VFL) lens (e.g., in a machine vision inspection system), and more particularly to monitoring the focus state of a VFL imaging system and/or optical power of a high speed variable focal length lens in that imaging system.

Description of the Related Art

Precision non-contact metrology systems such as precision machine vision inspection systems (or "vision systems" for short) may be utilized to obtain precise dimensional measurements of objects and to inspect various other object characteristics, and may include a computer, a camera and optical system, and a precision stage that moves to allow workpiece traversal and inspection. One exemplary prior art system is the QUICK VISION® series of PC-based vision systems and QVPAK® software available from Mitutoyo America Corporation (MAC), located in Aurora, Ill. The features and operation of the QUICK VISION® series of vision systems and the QVPAK® software are generally described, for example, in the QVPAK 3D CNC Vision Measuring Machine User's Guide, published January 2003, which is hereby incorporated by reference in its entirety. This type of system uses a microscope-type optical system and moves the stage to provide inspection images of either small or relatively large workpieces.

General-purpose precision machine vision inspection systems are generally programmable to provide automated video inspection. Such systems typically include GUI features and predefined image analysis "video tools" such that operation and programming can be performed by "non-expert" operators. For example, U.S. Pat. No. 6,542,180, which is incorporated herein by reference in its entirety, teaches a vision system that uses automated video inspection including the use of various video tools.

Multi-lens variable focal length (VFL) optical systems may be utilized for observation and precision measurement of surface heights, and may be included in a microscope and/or precision machine vision inspection system, for example as disclosed in U.S. Pat. No. 9,143,674, which is hereby incorporated herein by reference in its entirety. Briefly, a VFL lens is capable of acquiring multiple images at multiple focal lengths, respectively. One type of known VFL lens is a tunable acoustic gradient ("TAG") lens that creates a lensing effect using sound waves in a fluid medium. The sound waves may be created by application of an electrical field at a resonant frequency to a piezoelectric tube surrounding the fluid medium to create a time-varying density and index of refraction profile in the lens's fluid, which modulates its optical power and thereby the focal length or effective focus position of the optical system. A TAG lens may be used to periodically sweep a range of focal lengths at a resonant frequency of up to several hundred kHz, i.e., at a high speed. Such a lens may be understood in greater detail by the teachings of the article, "High speed varifocal imaging with a tunable acoustic gradient index of refraction lens" (Optics Letters, Vol. 33, No. 18, Sep. 15, 2008), which is hereby incorporated herein by reference in its entirety. Tunable acoustic gradient index lenses and related controllable signal generators are available, for example, from TAG Optics, Inc., of Princeton, N.J. The Model TL2.B.xxx series lenses, for example, are capable of modulation up to approximately 600 kHz.

While such VFL lenses can change effective focus position at a very high rate, variations in conditions such as temperature slightly alter their resonant characteristics and give rise to changes in optical power and modulation frequency, which may affect system performance and accuracy. An imaging system that can provide improvements with regard to such issues would be desirable.

BRIEF SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A variable focal length (VFL) lens system is provided including a VFL lens, a VFL lens controller, a camera, an objective lens, an exposure time controller, and a focus state reference subsystem according to principles disclosed herein. In various implementations, the VFL lens may be a tunable acoustic gradient index of refraction (TAG) lens. The VFL lens controller controls a drive signal of the VFL lens to periodically modulate the optical power of the VFL lens over a range of optical powers that occur at respective phase timings within the periodic modulation. The camera is arranged to receive light transmitted along an imaging optical path through the VFL lens during an image exposure and provides a corresponding camera image. The objective lens is arranged to input workpiece light arising from a workpiece during a workpiece image exposure and transmits the workpiece light along the imaging optical path through the VFL lens and to the camera during the workpiece image exposure, to provide a workpiece image in a corresponding camera image. An effective focus position in front of the objective lens during a workpiece image exposure corresponds to the optical power of the VFL lens during that workpiece image exposure. The exposure time controller is configured to control an image exposure timing used for a camera image.

As disclosed herein, the variable focal length (VFL) lens system further comprises a focus state reference subsystem comprising at least a focus state (FS) reference object and a reference object optics configuration. The reference object optics configuration is arranged to input reference object light arising from the FS reference object during a reference object image exposure, and transmit the reference object light along at least a portion of the imaging optical path to pass through the VFL lens and to the camera during the reference object image exposure, to provide a reference object image in a corresponding camera image. The FS reference object comprises a set of focus state (FS) reference regions that include a contrast pattern and that have respective known reference region image locations in reference object images and that are fixed at different respective reference region focus positions relative to the reference object optics configuration. When the foregoing elements are configured according to principles disclosed herein, a camera image that includes a best-focus image of a particular FS reference region defines a system focus reference state associated with that particular FS reference region, and that defined system focus reference state comprises at least one of a particular VFL optical power or a particular effective focus position associated with that particular FS reference region.

In some implementations, the FS reference object comprises a plurality of planar pattern surfaces fixed at different respective focus distances relative to the reference object optics configuration along its optical axis, and the set of focus state (FS) reference regions are arranged on the plurality of planar pattern surfaces.

In some implementations, the FS reference object comprises at least one pattern surface, at least part of which is not perpendicular to an optical axis of the reference object optics configuration. Different portions of the at least one pattern surface are fixed at different respective focus distances relative to the reference object optics configuration, and the set of focus state (FS) reference regions are arranged on the different portions of the at least one pattern surface. In some such implementations, the at least one pattern surface may comprise a planar pattern surface that is not normal to the optical axis of the reference object optics configuration, and the set of focus state (FS) reference regions may comprise different portions of a contrast pattern that extends along the planar pattern surface that is not normal to the optical axis.

In some implementations, the reference object optics configuration comprises a reference object imaging lens having a focal distance Fref along its optical axis, and the different respective reference region focus positions include at least one respective reference region focus distance located farther than Fref from the reference object imaging lens and at least one respective reference region focus distance located closer than Fref to the reference object imaging lens. In various implementations, Fref may be at least 30 millimeters, or at least 40 millimeters, or more.

In some implementations, the VFL lens system is configured such that the workpiece image is located in a first predetermined area of the camera image, and the respective known reference region image locations of the set of (FS) reference regions are located in a second predetermined area of the camera image that is different than the first predetermined area. In some such implementations, a workpiece image and a reference object image are exposed simultaneously in the same camera image.

In some implementations, the set of focus state (FS) reference regions are configured on the FS reference object such that their respective known reference region image locations in reference object images are located along one or more edges of the camera image, and not in a central area of the camera image. In some such implementations, the VFL lens system is configured such that the workpiece image is located in the central area of the camera image. In some such implementations, a workpiece image and a reference object image are exposed simultaneously in the same camera image.

In some implementations, the VFL lens system comprises a workpiece strobe light source configured to provide illumination to the workpiece during the workpiece image exposure, and the exposure time controller is configured to control a timing of the workpiece image exposure by controlling a strobe timing of the workpiece strobe light source. In some implementations, the VFL lens system comprises a reference object strobe light source configured to provide illumination to the reference object during the reference object image exposure, and the exposure time controller is configured to control a timing of the reference object image exposure by controlling a strobe timing of the reference object strobe light source. In some such implementations, the workpiece strobe light source and the reference object strobe light source are the same light source, the timing of the workpiece image exposure and the reference object image exposure are simultaneous, and a workpiece image and a reference object image are included in the same camera image. In other implementations, the workpiece strobe light source and the reference object strobe light source are different light sources, the timing of the workpiece image exposure and the reference object image exposure are different, and a workpiece image and a reference object image are included in different camera images.

In some implementations, the VFL lens system comprises a reference region focus analyzer configured to identify a best-focus image of a particular FS reference region in the camera image, and identify the particular effective focus position associated with that particular FS reference region as an effective focus position of the workpiece image in the same camera image.

BRIEF DESCRIPTION OF THE SEVERAL VIEWS OF THE DRAWINGS

FIGS. 9A, 9B and 9C are diagrams representing three camera images that include images of the reference object of FIG. 8 in three different focus states.

DETAILED DESCRIPTION

Figure 1:
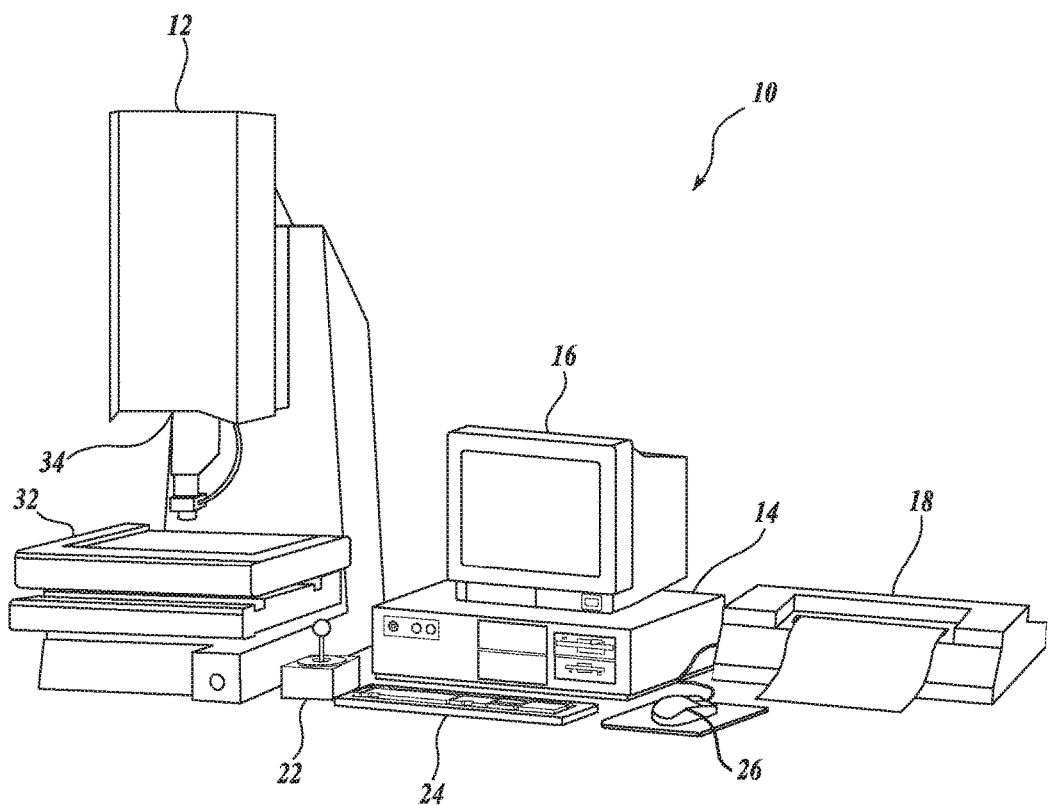
FIG. 1 is a diagram showing various typical components of a general-purpose precision machine vision inspection system.

FIG. 1 is a block diagram of one exemplary machine vision inspection system 10 usable as an imaging system in accordance with methods described herein. The machine vision inspection system 10 includes a vision measuring machine 12 that is operably connected to exchange data and control signals with a controlling computer system 14. The controlling computer system 14 is further operably connected to exchange data and control signals with a monitor or display 16, a printer 18, a joystick 22, a keyboard 24, and a mouse 26. The monitor or display 16 may display a user interface suitable for controlling and/or programming the operations of the machine vision inspection system 10. It will be appreciated that in various implementations, a touch-screen tablet or the like may be substituted for and/or redundantly provide the functions of any or all of the elements 14, 16, 22, 24 and 26.

Those skilled in the art will appreciate that the controlling computer system 14 may generally be implemented using any suitable computing system or device, including distributed or networked computing environments, and the like. Such computing systems or devices may include one or more general-purpose or special-purpose processors (e.g., non-custom or custom devices) that execute software to perform the functions described herein. Software may be stored in memory, such as random-access memory (RAM), read-only memory (ROM), flash memory, or the like, or a combination of such components. Software may also be stored in one or more storage devices, such as optical-based disks, flash memory devices, or any other type of non-volatile storage medium for storing data. Software may include one or more program modules that include routines, programs, objects, components, data structures, and so on that perform particular tasks or implement particular abstract data types. In distributed computing environments, the functionality of the program modules may be combined or distributed across multiple computing systems or devices and accessed via service calls, either in a wired or wireless configuration.

The vision measuring machine 12 includes a moveable workpiece stage 32 and an optical imaging system 34 that may include a zoom lens or interchangeable objective lenses. The zoom lens or interchangeable objective lenses generally provide various magnifications for the images provided by the optical imaging system 34. Various implementations of the machine vision inspection system 10 are also described in commonly assigned U.S. Pat. Nos. 7,454,053; 7,324,682; 8,111,905; and 8,111,938, each of which is hereby incorporated herein by reference in its entirety.

Figure 2:
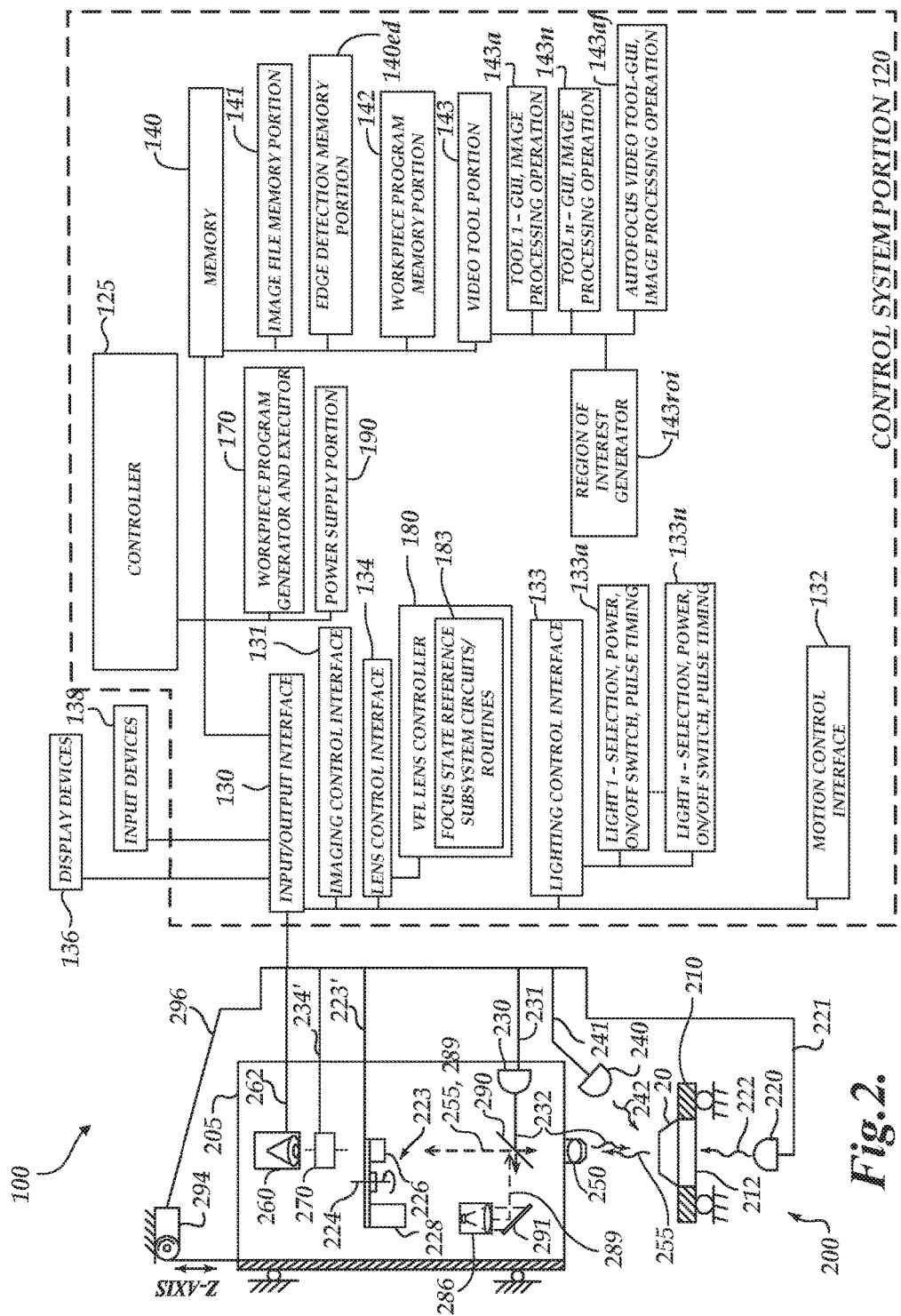
FIG. 2 is a block diagram of a control system portion and a vision components portion of a machine vision inspection system similar to that of FIG. 1 and including certain features disclosed herein.

FIG. 2 is a block diagram of a control system portion 120 and a vision components portion 200 of a machine vision inspection system 100 similar to the machine vision inspection system of FIG. 1, including certain features disclosed herein. As will be described in more detail below, the control system portion 120 is utilized to control the vision components portion 200. The vision components portion 200 includes an optical assembly portion 205, light sources 220, 230, 240, and a workpiece stage 210 having a central transparent portion 212. The workpiece stage 210 is controllably movable along x- and y-axes that lie in a plane that is generally parallel to the surface of the stage where a workpiece 20 may be positioned.

The optical assembly portion 205 includes a camera system 260, an interchangeable objective lens 250, a variable focal length (VFL) lens 270 (e.g., a TAG lens in various exemplary implementations), and a focus state reference subsystem 286, as disclosed herein in greater detail below. In various implementations, the optical assembly portion 205 may further include a turret lens assembly 223 having lenses 226 and 228. As an alternative to the turret lens assembly, in various implementations a fixed or manually interchangeable magnification-altering lens, or a zoom lens configuration, or the like, may be included. In various implementations, the interchangeable objective lens 250 may be selected from a set of fixed magnification objective lenses that are included as part of the variable magnification lens portion (e.g., a set of objective lenses corresponding to magnifications such as 0.5×, 1×, 2× or 2.5×, 5×, 10×, 20× or 25×, 50×, 100×, etc.)

The optical assembly portion 205 is controllably movable along a z-axis that is generally orthogonal to the x- and y-axes by using a controllable motor 294 that drives an actuator to move the optical assembly portion 205 along the z-axis to change the focus of the image of the workpiece 20. The controllable motor 294 is connected to an input/output interface 130 via a signal line 296. As will be described in more detail below, to change the focus of the image over a smaller range, or as an alternative to moving the optical assembly portion 205, the VFL (TAG) lens 270 may be controlled via a signal line 234' by a lens control interface 134 to periodically modulate the optical power of the VFL lens 270 and thus modulate an effective focus position of the optical assembly portion 205. The lens control interface 134 may include a VFL lens controller 180 according to various principles disclosed herein, as described in greater detail below. A workpiece 20 may be placed on the workpiece stage 210. The workpiece stage 210 may be controlled to move relative to the optical assembly portion 205, such that the field of view of the interchangeable objective lens 250 moves between locations on the workpiece 20, and/or among a plurality of workpieces 20.

One or more of a stage light source 220, a coaxial light source 230, and a surface light source 240 (e.g., a ring light) may emit source light 222, 232, and/or 242, respectively, to illuminate the workpiece or workpieces 20. For example, during an image exposure, the coaxial light source 230 may emit source light 232 along a path including a beam splitter 290 (e.g., a partial mirror). The source light 232 is reflected or transmitted as workpiece light 255, and the workpiece light used for imaging passes through the interchangeable objective lens 250, the turret lens assembly 223 and the VFL lens 270 and is gathered by the camera system 260. A workpiece image exposure which includes the image of the workpiece(s) 20, is captured by the camera system 260, and is output on a signal line 262 to the control system portion 120.

In the illustrated implementation, the beam splitter 290 may transmit some of the source light 232 to be reflected by a mirror 291 to illuminate a reference object included in the focus state reference subsystem 286, as described in greater detail below. In such an implementation, reference object light 289 may be returned to the mirror 291 and the beam splitter 290 and reflected to continue along at least a portion of the imaging optical path to pass through the VFL lens 270 and to the camera system 260 during a reference object image exposure, to provide a reference object image in a corresponding camera image, as described in greater detail below. However, in other implementations, the focus state reference subsystem 286 may include a separately controlled illumination source (e.g., as described below with reference to FIG. 3.)

Various light sources (e.g., the light sources 220, 230, 240) may be connected to a lighting control interface 133 of the control system portion 120 through associated signal lines (e.g., the busses 221, 231, 241, respectively). In various implementations, this may include a light source of the focus state reference subsystem 286, as described further below. The control system portion 120 may control the turret lens assembly 223 to rotate along axis 224 to select a turret lens through a signal line or bus 223' to alter an image magnification.

As shown in FIG. 2, in various exemplary implementations, the control system portion 120 includes a controller 125, the input/output interface 130, a memory 140, a workpiece program generator and executor 170, and a power supply portion 190. Each of these components, as well as the additional components described below, may be interconnected by one or more data/control busses and/or application programming interfaces, or by direct connections between the various elements. The input/output interface 130 includes an imaging control interface 131, a motion control interface 132, a lighting control interface 133, and the lens control interface 134. The lens control interface 134 may include or be connected to a VFL lens controller 180 including circuits and/or routines for controlling various image exposures synchronized with the periodic focus position modulation provided by the VFL lens 270, and including focus state reference subsystem circuits/routines 183 according to principles disclosed herein, as described in greater detail below with reference to similar or identical elements 380 and 383 shown in FIG. 3. In some implementations, the lens control interface 134 and the VFL lens controller 180 may be merged and/or indistinguishable.

Figure 3:
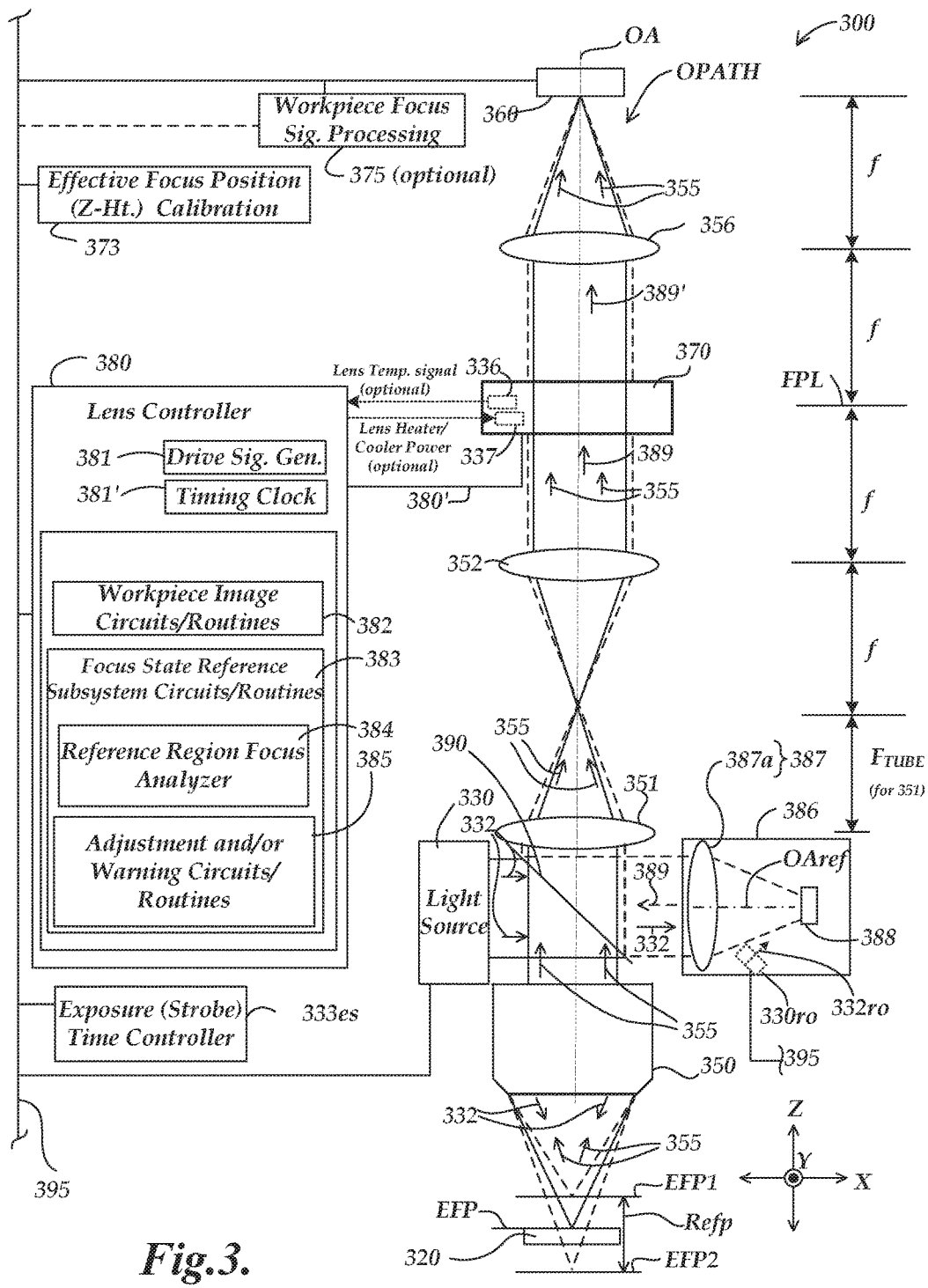
FIG. 3 is a schematic diagram of a VFL imaging system that may be adapted to a precision non-contact metrology system such as a machine vision inspection system, including a focus state reference subsystem according to principles disclosed herein.

The lighting control interface 133 may include lighting control elements 133a-133n, that control, for example, the selection, power, on/off switch, and strobe pulse timing, if applicable, for the various corresponding light sources of the machine vision inspection system 100. In some embodiments, an exposure (strobe) time controller 333es as shown in FIG. 3 may provide strobe timing signals to one or more of the lighting control elements 133a-133n, such that they provide an image exposure strobe timing that is synchronized with a desired phase time of the VFL lens focus position modulation, and as described in greater detail below. In some implementations, the exposure (strobe) time controller 333es and one or more of the lighting control elements 133a-133n may be merged and/or indistinguishable.

The memory 140 may include an image file memory portion 141, an edge-detection memory portion 140ed, a workpiece program memory portion 142 that may include one or more part programs, or the like, and a video tool portion 143. The video tool portion 143 includes video tool portion 143a and other video tool portions (e.g., 143n) that determine the GUI, image-processing operation, etc., for each of the corresponding video tools, and a region of interest (ROI) generator 143roi that supports automatic, semi-automatic, and/or manual operations that define various ROIs that are operable in various video tools included in the video tool portion 143. Examples of the operations of such video tools for locating edge features and performing other workpiece feature inspection operations are described in more detail in certain of the previously incorporated references, as well as in U.S. Pat. No. 7,627,162, which is hereby incorporated herein by reference in its entirety.

The video tool portion 143 also includes an autofocus video tool 143af that determines the GUI, image-processing operation, etc., for focus height measurement operations. In various implementations, the autofocus video tool 143af may additionally include a high-speed focus height tool that may be utilized to measure focus heights with high speed using hardware described in FIG. 3, as described in more detail in U.S. Pat. No. 9,143,674, which is hereby incorporated herein by reference in its entirety. In various implementations, the high-speed focus height tool may be a special mode of the autofocus video tool 143af that may otherwise operate according to conventional methods for autofocus video tools, or the operations of the autofocus video tool 143af may only include those of the high-speed focus height tool. High-speed autofocus and/or focus position determination for an image region or regions of interest may be based on analyzing the image to determine a corresponding quantitative contrast metric for various regions, according to known methods. For example, such methods are disclosed in U.S. Pat. Nos. 8,111,905; 7,570,795; and 7,030,351, which are hereby incorporated herein by reference in their entirety.

In the context of this disclosure, and as is known by one of ordinary skill in the art, the term "video tool" generally refers to a relatively complex set of automatic or programmed operations that a machine vision user can implement through a relatively simple user interface. For example, a video tool may include a complex pre-programmed set of image-processing operations and computations that are applied and customized in a particular instance by adjusting a few variables or parameters that govern the operations and computations. In addition to the underlying operations and computations, the video tool comprises the user interface that allows the user to adjust those parameters for a particular instance of the video tool. It should be noted that the visible user interface features are sometimes referred to as the video tool, with the underlying operations being included implicitly.

One or more display devices 136 (e.g., the display 16 of FIG. 1) and one or more input devices 138 (e.g., the joystick 22, keyboard 24, and mouse 26 of FIG. 1) may be connected to the input/output interface 130. The display devices 136 and input devices 138 may be used to display a user interface that may include various graphical user interface (GUI) features that are usable to perform inspection operations, and/or to create and/or modify part programs, to view the images captured by the camera system 260, and/or to directly control the vision components portion 200.

In various exemplary implementations, when a user utilizes the machine vision inspection system 100 to create a part program for the workpiece 20, the user generates part program instructions by operating the machine vision inspection system 100 in a learn mode to provide a desired image-acquisition training sequence. For example, a training sequence may comprise positioning a particular workpiece feature of a representative workpiece in the field of view (FOV), setting light levels, focusing or autofocusing, acquiring an image, and providing an inspection training sequence applied to the image (e.g., using an instance of one of the video tools on that workpiece feature). The learn mode operates such that the sequence(s) are captured or recorded and converted to corresponding part program instructions. These instructions, when the part program is executed, will cause the machine vision inspection system to reproduce the trained image acquisition and cause inspection operations to automatically inspect that particular workpiece feature (that is the corresponding feature in the corresponding location) on a run mode workpiece, or workpieces, which matches the representative workpiece used when creating the part program. In some implementations, such techniques may be utilized to create a part program instruction for analyzing a reference object image, to provide functions and operations described in more detail below.

FIG. 3 is a schematic diagram of a VFL lens system 300 (also referred to as imaging system 300) that includes a VFL lens 370 (e.g., a TAG lens) and a focus state reference subsystem 386 configured according to principles disclosed herein. The VFL lens system 300 may be adapted to a machine vision system or configured as a standalone system, and may be operated according to principles disclosed herein. It will be appreciated that certain numbered components 3XX of FIG. 3 may correspond to and/or provide similar operations or functions as similarly numbered components 2XX of FIG. 2, and maybe similarly understood unless otherwise indicated. As will be described in more detail below, an imaging optical path OPATH comprises various optical components arranged along a path that conveys workpiece imaging light 355 from the workpiece 320 to the camera 360. The imaging light is generally conveyed along the direction of their optical axes OA. In the implementation shown in FIG. 3, all the optical axes OA are aligned. However, this implementation is exemplary only and not limiting. More generally, the imaging optical path OPATH may include mirrors and/or other optical elements, and may take any form that is operational for imaging the workpiece 320 using a camera (e.g., the camera 360) according to known principles. In the illustrated implementation, the imaging optical path OPATH includes the VFL lens 370 (which may be included in a 4f imaging configuration) and is utilized at least in part for imaging a surface of a workpiece 320 during a workpiece image exposure. As will be described in more detail below, in accordance with principles disclosed herein, the focus state reference subsystem 386 may be utilized to transmit the reference object light along at least a portion of the imaging optical path OPATH to pass through the VFL lens 370 to form one or more reference object image exposures, which may be analyzed for their focus characteristics and compared to the corresponding stored characteristics associated with system focus reference states (e.g., calibration states) to enable sensing of changes or errors in the expected optical power of the VFL lens 370 and/or the effective focus position of the VFL lens system 300.

As shown in FIG. 3, the VFL lens system 300 includes a light source 330, an objective lens 350, a tube lens 351, a relay lens 352, a VFL (TAG) lens 370, a relay lens 356, a lens controller 380, a camera 360, an effective focus position (Z-height) calibration portion 373, a workpiece focus signal processing portion 375 (optional), and a focus state reference subsystem 386. In various implementations, the various components may be interconnected by direct connections or one or more data/control busses (e.g., a system signal and control bus 395) and/or application programming interfaces, etc.

In the implementation shown in FIG. 3, the light source 330 may be a "coaxial" or other light source configured to emit the source light 332 (e.g., with strobed or continuous illumination) along a path including a beam splitter 390 (e.g., a partially reflecting mirror as part of a beam splitter) and through the objective lens 350 to a surface of a workpiece 320, wherein the objective lens 350 receives the workpiece light 355 that is focused at an effective focus position EFP proximate to the workpiece 320, and outputs the workpiece light 355 to the tube lens 351. The tube lens 351 receives the workpiece light 355 and outputs it to the relay lens 352. In other implementations, analogous light sources may illuminate the field of view in a non-coaxial manner; for example a ring light source may illuminate the field of view. In various implementations, the objective lens 350 may be an interchangeable objective lens and the tube lens 351 may be included as part of a turret lens assembly (e.g., similar to the interchangeable objective lens 250 and the turret lens assembly 223 of FIG. 2). In various implementations, any of the other lenses referenced herein may be formed from or operate in conjunction with individual lenses, compound lenses, etc.

The relay lens 352 receives the workpiece light 355 and outputs it to the VFL (TAG) lens 370. The VFL (TAG) lens 370 receives the workpiece light 355 and outputs it to the relay lens 356. The relay lens 356 receives the workpiece light 355 and outputs it to the camera 360. In various implementations, the camera 360 captures a camera image during an image exposure (e.g., during an integration period of the camera 360) also referred to as an image exposure period, and may provide the corresponding image data to a control system portion. Some camera images may include a workpiece image (e.g., of a region of the workpiece 320) provided during a workpiece image exposure. In some embodiments, the workpiece image exposure may be limited or controlled by a strobe timing of the light source 330 that falls within an image integration period of the camera 360. As described in greater detail below, some camera images may include a reference object image (e.g., of a reference object 388) provided during a reference object image exposure. In some embodiments, the reference object image exposure may be limited or controlled by a strobe timing of the light source 330 or 330ro that falls within an image integration period of the camera 360. In various implementations, the camera 360 may have a pixel array greater than 1 megapixel (e.g., 1.3 megapixel, with a 1280×1024 pixel array, with 5.3 microns per pixel).

In the example of FIG. 3, the relay lenses 352 and 356 and the VFL (TAG) lens 370 are designated as being included in a 4f optical configuration, while the relay lens 352 and the tube lens 351 are designated as being included in a Keplerian telescope configuration, and the tube lens 351 and the objective lens 350 are designated as being included in a microscope configuration. All of the illustrated configurations will be understood to be exemplary only, and not limiting with respect to the present disclosure. In various implementations, the illustrated 4f optical configuration permits placing the VFL (TAG) lens 370 (e.g., which may be a low numerical aperture (NA) device) at the Fourier plane of the objective lens 350. This configuration may maintain the telecentricity at the workpiece 320 and may minimize scale change and image distortion (e.g., including providing constant magnification for each Z-height of the workpiece 320 and/or effective focus position EFP). The Keplerian telescope configuration (e.g., including the tube lens 351 and the relay lens 352) may be included between the microscope configuration and the 4f optical configuration, and may be configured to provide a desired size of the projection of the objective lens clear aperture at the location of the VFL (TAG) lens 370, so as to minimize image aberrations, etc.

In various implementations, the lens controller 380 may include a drive signal generator portion 381, a timing clock 381', workpiece imaging circuits/routines 382 and focus state reference subsystem circuits/routines 383. The drive signal generator portion 381 may operate (e.g., in conjunction with the timing clock 381') to provide a periodic drive signal to the high speed VFL (TAG) lens 370 via a signal line 380'. In various implementations, the VFL lens system (or imaging system) 300 may comprise a control system (e.g., the control system portion 120 of FIG. 2) that is configurable to operate in conjunction with the lens controller 380 for coordinated operations.

In various implementations, the lens controller 380 may generally perform various functions related to imaging a workpiece 320 or reference object 388 in a manner synchronized with a desired phase timing of the VFL lens 370, as well as controlling, monitoring and adjusting the driving and response of the VFL lens 370. In various implementations, the workpiece imaging circuits/routines 382 perform standard workpiece imaging operations for the optical system, synchronized with the phase timing of the VFL lens 370 as known in the art and as described in the incorporated references. As will be described in more detail below, in various implementations the focus state reference subsystem circuits/routines 383 may perform focus state monitoring and/or stabilization in accordance with principles disclosed herein. In various implementations, the focus state monitoring and/or stabilization may be performed on an on-demand basis (e.g., in response to a user selection in a user interface, or when a particular condition is detected, etc.), or may be performed periodically (once every second, or 10 seconds, or hour, etc.). In some implementations, the lens controller 380 may operate such that a reference object image exposure required for focus state monitoring does not overlap with a workpiece image exposure, although any adjustments to the system (e.g., to adjust the operation of the VFL lens 370) determined during the focus state monitoring will continue to be applied and utilized during subsequent workpiece imaging.

The focus state reference subsystem circuits/routines 383 include a reference region focus analyzer 384 and adjustment and/or warning circuits/routines 385. In various implementations, the reference region focus analyzer 384 may perform functions such as inputting reference object images (e.g., as included in camera images) and calling certain video tools (e.g., a known type of autofocus video tool, or multi-region or multi-point autofocus video tool, or the like) or other focus analysis routines to determine one or more focus characteristic values (e.g., a quantitative contrast and/or focus metric) for focus state reference regions (FSRRs) in the reference object images used for focus state monitoring, etc. In various implementations, the adjustment and/or warning circuits/routines 385 may input the determined focus characteristic results/values from reference region focus analyzer 384, and may compare the results/values to corresponding stored calibration results/values for corresponding FS reference regions, in order to determine whether adjustments need to be made. As will be described in more detail below, in various implementations adjustments may include (but are not limited to) adjusting an amplitude for driving the VFL lens 370 (e.g., for adjusting its optical power range and the resulting effective focus position range), a phase timing adjustment (e.g., for adjusting the phase timing used to provide particular effective focus positions or Z-heights), a VFL lens temperature adjustment, etc. In various implementations, such adjustments may be implemented through changes to the control signals of the drive signal generator portion 381, timing clock 381', and/or lens heater/cooler 337, etc., as will be described in more detail below. In various implementations, the focus state reference subsystem circuits/routines 383 may in some instances repeatedly perform operations to iteratively analyze and adjust the system until the optical power range of the VFL lens and/or the resulting effective focus position range is at desired levels (e.g., within a desired tolerance relative to stored calibration or reference levels).

Drift in the operating characteristics of the VFL lens may arise due to unwanted temperature variations. As shown in FIG. 3, in various implementations, the imaging system 300 may optionally include the lens heater/cooler 337 associated with the VFL lens 370. The lens heater/cooler 337 may be configured to input an amount of heat energy into the VFL lens 370 and/or perform cooling functions to facilitate heating and/or cooling of the VFL lens 370 according to some implementations and/or operating conditions. In addition, in various implementations a VFL lens monitoring signal may be provided by a temperature sensor 336 associated with the VFL lens 370 to monitor an operating temperature of the VFL lens 370.

As will be described in more detail below, during focus state monitoring, reference object image exposures may be provided by using the camera 360 to capture images of the reference object 388 through the reference object optics configuration 387, which are both included in the focus state reference subsystem 386. In some implementations, some of the light 332 from the light source 330 may pass through the beam splitter 390 and may be used for reference object image exposures. In other implementations, the focus state reference subsystem 386 may also comprise a reference object light source 330ro that provides a light 332ro that is used for reference object image exposures. The reference object light source 330ro may be connected to and controlled by signals and/or controlled power over the system signal and control bus 395, which may be governed by the exposure time controller 333es, or the like, as previously outlined. In any case, reference object light arises from the FS reference object and the reference object optics configuration 387 transmits the reference object light along at least a portion of the imaging optical path OPATH to pass through the VFL lens 370 and to the camera 360 during a reference object image exposure, to provide a reference object image in a corresponding camera image (e.g., as will be described in more detail below with respect to FIGS. 4, 5, 8 and 9). In some implementations, the focus state reference subsystem 386 may be configured to transmit the reference object light from a Fourier plane of the microscope configuration of the objective lens 350 and the tube lens 351, if desired. As will be described in more detail below with respect to FIGS. 5A-5C, the camera 360 may provide reference object images (e.g., such as the exemplary images 500A-500C) exposed during corresponding phase timings of the periodic modulation of the VFL lens 370 and the resulting effective focus position of the imaging system 300 to support focus state monitoring operations. As explained in greater detail below, focus characteristic values for members of a set of FS reference regions included in reference object images exposed using particular known phase timings (e.g., such as the exemplary images 500A-500C) are related to an optical power of the VFL lens 370 and the resulting effective focus position of the imaging system 300 during the corresponding phase timings.

In various implementations, the FS reference object 388 comprises a set of focus state (FS) reference regions that include a contrast pattern and that have respective known reference region image locations in reference object images and that are fixed at a different respective reference region focus distances or positions relative to the reference object optics configuration 387, as explained in greater detail below with reference to FIGS. 4, 5, 8 and 9. As a result, a camera image that includes a best-focus image of a particular FS reference region defines a system focus reference state associated with that particular FS reference region. That defined system focus reference state comprises at least one of a particular VFL optical power or a particular effective focus position associated with that particular FS reference region, as described further below with reference to FIGS. 6 and 7. In the illustrated implementation, the reference object optics configuration 387 comprises a lens 387a which transmits reference object light 389 that arises from the FS reference object 388 toward the beam splitter 390. The partially reflecting beam splitter 390 directs the light 389 of the reference object image along the imaging optical path OPATH, which passes through the VFL lens 370 and emerges as light 389' which forms the image of the reference object in the reference object image exposure that is produced by the camera 360 to support focus state monitoring.

In various implementations, as described in greater detail below, the lens 387a is generally configured to provide the desired divergence, or near collimation, for the reference object light 389 that arises from the FS reference object 388 and results in the reference object image. It will be appreciated that in other implementations, other locations and/or configurations of the components of the focus state reference subsystem 386 may be utilized. For example, in various alternative implementations, the lens 387a of the reference object optics configuration 387 may be a compound lens, or a set of lenses may be used, and/or one or more additional reflectors may be used to reshape the reference object optical path (e.g., OAref), and/or wavelength filters may be included (in combination with using a specific wavelength range in the light source 330ro) to isolate workpiece images and reference object images from one another according to known principles, or the like. In one implementation, a wavelength filter may be shaped and located to filter narrow band reference object light 389 from that portion of the camera image (e.g., the central portion) that is intended to receive only the workpiece light 355, and to not filter the narrow band reference object light 389 from that portion of the camera image (e.g., the peripheral portion) that is intended to provide a reference object image. In some implementations, wavelength filters (e.g., dichroic filters) may be added to one or more elements depicted in FIG. 3, (e.g., the beam splitter 390). In other implementations, wavelength filters may be added as separate elements. In another configuration, the focus state reference subsystem 386 may be located on the same side of the beam splitter 390 as the light source 330, with corresponding transmissive and/or reflective properties of the beam splitter 390 and/or additional reflective surfaces utilized for directing the reference object light 389 along the imaging optical path OPATH.

In various implementations, the light 389 of the reference object image has a pattern and beam divergence that is determined by the reference object optics configuration 387 of focus state reference subsystem 386. The VFL lens 370 receives the light 389 of the reference object image and outputs the light 389' of the reference object image, for which the image focus location (e.g., at the camera 360) is periodically altered by the periodic optical power variation associated with the operation of the VFL lens 370. It will be appreciated that the point conjugate to the camera image plane, that is, the focused plane in the vicinity of the reference object 388 is thus also periodically altered or swept due to the periodic optical power variation associated with the operation of the VFL lens 370. When different respective focus state (FS) reference regions on the reference object 388 are located at different respective distances from the reference object optics configuration 387, they will thus be focused in respective images acquired at different respective times during the periodic optical power variation of the VFL lens 370. Thus, a focus state reference subsystem 386 including such a reference object 388 may be used to determine whether the VFL lens system 300 is stable in its operation, and/or in a desired (e.g., calibrated) focus state at various times during the periodic optical power variation of the VFL lens 370, and/or to directly determine the effective focus position of a particular image, in various implementations, as described in greater detail below.

With respect to the general operations of the VFL lens 370, in various implementations as described above, the lens controller 380 may rapidly adjust or modulate its optical power periodically, to achieve a high-speed VFL lens capable of a periodic modulation (i.e., at a VFL lens resonant frequency) of 250 kHz, or 70 kHz, or 30 kHz, or the like. As shown in FIG. 3, by using the periodic modulation of a signal to drive the VFL lens 370, the effective focus position EFP of the imaging system 300 (that is, the focus position in front of the objective lens 350) may be (rapidly) moved within a range Refp (e.g., an autofocus search range) bound by an effective focus position EFP1 (or EFPmax) corresponding to a maximum optical power of the VFL lens 370 in combination with the objective lens 350, and an effective focus position EFP2 (or EFPmin) corresponding to a maximum negative optical power of the VFL lens 370 in combination with the objective lens 350. In various implementations, EFP1 and EFP2 may approximately correspond to phase timings of 90 degrees and 270 degrees, as will be described in more detail below). For purposes of discussion, the middle of the range Refp may be designated as EFPnom, and may correspond to zero optical power of the VFL lens 370 in combination with the nominal optical power of the objective lens 350. According to this description, EFPnom may approximately correspond to the nominal focal length of the objective lens 350 in some implementations.

In one implementation, the optional workpiece focus signal processing portion 375 (optional) may input data from the camera 360 and may provide data or signals that are utilized to determine when an imaged surface region (e.g., of the workpiece 320) is at an effective focus position in an image. For example, a group of images acquired by the camera 360 at different Z-heights (e.g., an image stack), may be analyzed using a known "maximum contrast" or "best-focus image" analysis to determine if or when an imaged surface region of the workpiece 320 is at corresponding effective focus position in an image. However, more generally, any other suitable known image focus detection configuration may be used. In any case, the workpiece focus signal processing portion 375 or the like may input an image or images acquired during the periodic modulation of the effective focus position (sweeping of multiple effective focus positions) of the VFL (TAG) lens 370, and determine an image wherein a target feature is best-focused. In some implementations, the workpiece focus signal processing portion 375 may further determine the known phase timing corresponding to that best-focus image and output that "best-focus" phase timing value to the effective focus position calibration portion 373. The effective focus position calibration portion 373 may provide Z-height (effective focus position) calibration data that relates respective Z-heights or effective focus positions to respective "best-focus" phase timings within a period of a standard imaging resonant frequency of the VFL lens 370, wherein the calibration data corresponds to operating the VFL lens 370 according to a standard imaging drive control configuration or reference state.

Generally speaking, the effective focus position calibration portion 373 comprises recorded Z-height (or effective focus position) calibration data. As such, its representation in FIG. 3 as a separate element is intended to be a schematic representation only, and not limiting. In various implementations, the associated recorded Z-height calibration data may be merged with and/or indistinguishable from the lens controller 380, the workpiece focus signal processing portion 375, or a host computer system connected to the system signal and control bus 395, etc.

In various implementations, the exposure (strobe) time controller 333es controls an image exposure time of the imaging system 300 (e.g., relative to a phase timing of the periodically modulated effective focus position). Specifically, in some implementations, during an image exposure the exposure (strobe) time controller 333es (e.g., using the Z-height calibration data available in the effective focus position calibration portion 373), may control the light source 330 (and/or 330ro) to strobe at a respective controlled time. For example, the exposure (strobe) time controller 333es may control the strobe light source to strobe at a respective phase timing within a period of a standard imaging resonant frequency of the VFL lens 370, so as to acquire an image having a particular effective focus position within the sweeping (periodic modulation) range of the VFL lens 370. In other implementations, the exposure time controller 333es may control a fast electronic camera shutter of the camera 360 to acquire an image at a respective controlled time and/or its associated effective focus position. In some implementations, the exposure (strobe) time controller 333es may be merged with or indistinguishable from the camera 360. It will be appreciated that the operations of the exposure time controller 333es and other features and elements outlined above may be implemented to govern workpiece image acquisitions, reference object image acquisitions, or both, in various implementations. As will be described in more detail below with respect to FIGS. 5A-5C and FIG. 9A-9C in certain specific example implementations, reference object image exposures may thus be controlled to correspond to specified phase timings related to the structure of the reference object (e.g., particular phase timings that are expected to provide a best-focus image of particular FS regions of the reference object 388) when the VFL lens system 300 is operating in a stable manner in a calibrated or reference state.

Figure 4:
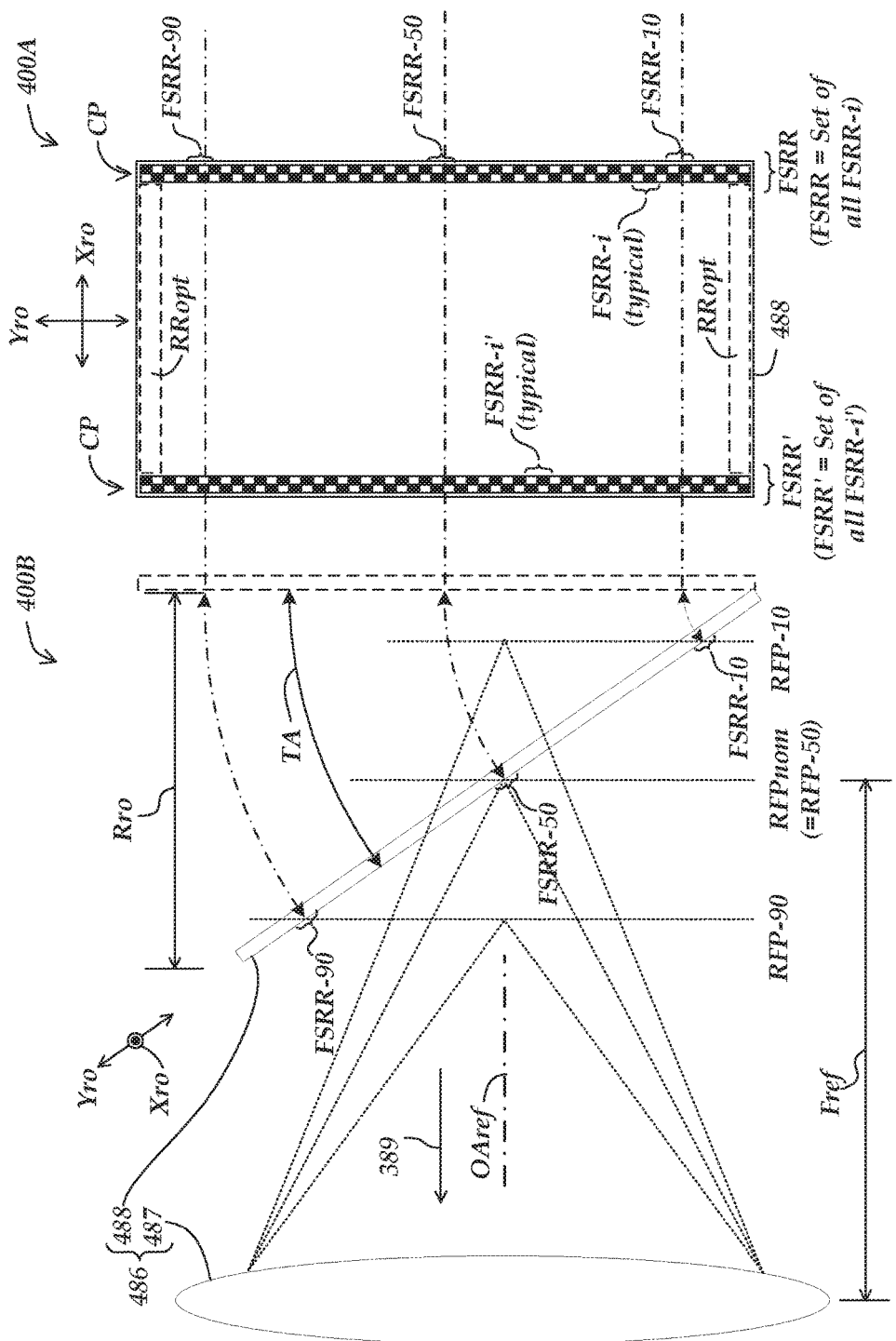
FIG. 4 is a diagram showing an implementation including a first embodiment of a reference object usable in a focus state reference subsystem according to principles disclosed herein.

FIG. 4 includes two related diagrams. A first embodiment of a reference object 488 is shown in a plan view in diagram 400A. The diagram 400B is a side view diagram, wherein the reference object 488 is shown tilted at a tilt angle TA, as imaged using the reference object optics configuration 487, in a first implementation of focus state reference subsystem 486 according to principles disclosed herein. The focus state reference subsystem 486 may be operated as, or substitute for, the focus state reference subsystem 386 described with reference to FIG. 3 and its operation may be understood, in part, based on previous description.

As shown in the diagram 400A, the reference object 488 has a planar "pattern surface" that includes a contrast pattern CP arranged along at least a portion of its periphery. It is generally desirable that the contrast pattern CP include high contrast edges arranged at a high spatial frequency and to allow the determination of a quantitative contrast or focus metric for relative small image regions (e.g., as small as 9×9, or 5×5 pixels, or smaller in various implementations) in a reference object image (e.g., as provided by the camera 360). As shown in FIG. 4, various focus state reference regions (FSRR) of the contrast pattern CP are arranged along the periphery (e.g., see representative regions FSRR-10, FSRR-50 and FSRR-90) such that they are at different focus positions along the optical axis OAref, when the reference object 488 is tilted at the tilt angle TA. It will be appreciated that the contrast pattern CP may optionally be included in the areas RRopt, which could provide large FSRR's having the same focus position throughout, and which could provide a particularly high quality "focus curve" (that is, a curve for a contrast or focus metric vs. imaging focus position), for determining a best-focus position and/or deviations compared to a best-focus position, as disclosed in the incorporated references.

FSRR's as referred to herein may be considered to be any region on a reference object 488 that includes a contrast pattern CP at a reference region image location in reference object images, as may be known by design or calibration. Respective FSRRs are fixed at different respective reference region focus distances or reference focus positions RFP relative to the reference object optics configuration 487. Thus, according to previously outlined principles and description, a camera image that includes a best-focus image of a particular FS reference region defines a system focus reference state associated with that particular FS reference region, and that defined system focus reference state comprises at least one of a particular VFL optical power or a particular effective focus position associated with that particular FS reference region.

In the example shown in FIG. 4, the contrast pattern CP may be understood to be distributed throughout a continuously distributed set of adjacent reference regions FSRR (and FSRR') (which may be individually designated FSRR-i, FSRR-i', using a respective individual index "i"). The reference regions may be defined to be as small as desired, provided that a meaningful contrast or focus metric can be determined for them, so that it can be determined when they are imaged at a "best-focus" position. In the implementation shown in FIG. 4, the three focus state reference regions FSRR-10, FSRR-50 and FSRR-90 will be understood to be representative of many more individual FSRRs in the set FSRR (or FSRR'). As shown in the diagram 400B, when the reference object 488 is operationally arranged at the tilt angle TA, FSRR-10, FSRR-50 and FSRR-90 (and FSRR-10', FSRR-50', FSRR-90') are arranged relative to the reference object optics configuration 487 at different reference focus positions RFP-10, RFP-50 and RFP-90, respectively. It will be appreciated that other respective FSRR-i have other respective reference focus positions RFP-i within a reference object focus position range Rro.

In the focus state reference subsystem 486, the different respective FSRRs include at least one respective reference region focus distance located farther than Fref and at least one respective reference region focus distance located closer than Fref to the reference object optics configuration 487. In one exemplary implementation, Fref may be at least 30 millimeters, or at least 40 millimeters, or more. In one exemplary embodiment, Fref may be 36 millimeters, and the tilt angle TA may be about 25-40 degrees (e.g., 37 degrees), to provide a desired reference object focus range Rro. The dimensions of the reference object 488 may be approximately 2.0×1.0 millimeters along the axes Yro and Yro, respectively. Any reference object disclosed herein may incorporate a somewhat diffusive or scattering surface with any imaged pattern surface, to allow more robust imaging, reduced alignment requirements, and reduced unwanted reflections. Such a focus state reference subsystem 486 may be incorporated into an exemplary VFL lens system such as those described with reference to FIGS. 1-3, and imaged onto the periphery of 1280×1024 pixel camera (e.g., the camera 360) to provide a reference object image usable according to principles disclosed herein.

When the focus state reference subsystem 486 is used in a system such as that previously outlined with reference to FIG. 3 (e.g., in place of the focus state reference subsystem 386), the reference object optics configuration 487 may comprise a lens which transmits reference object light 389 that arises from the FS reference object 488 toward the beam splitter 390. The partially reflecting beam splitter 390 directs the light 389 of the reference object image along the imaging optical path OPATH, which passes through the VFL lens 370 and emerges as light 389' which forms the image of the reference object 488 in the reference object image exposure that is produced by the camera 360 to support focus state monitoring, as described in greater detail below with reference to FIGS. 5, 6 and 7.

FIGS. 5A, 5B and 5C are diagrams representing three camera images that include images of the reference object 488 of FIG. 4 in three different focus states. In particular, FIG. 5A represents a reference object image ROI-Ph-10 focused at the reference focus position RFP-10 where the FSRR-10 is best-focused; FIG. 5B represents a reference object image ROI-Ph-50 focused at the reference focus position RFP-50 where FSRR-50 is best-focused; and FIG. 5C represents reference object image ROI-Ph-90 focused at the reference focus position RFP-90 where the FSRR-90 is best-focused. The reference focus positions RFP-10, RFP-50, RFP-90, are shown in FIG. 4. Different degrees of image focus or blur are schematically represented in FIGS. 5A, 5B and 5C by different cross-hatch patterns. As shown, representative FSRR-10 (FSRR-10') has an image location reference region image location (RRIL) RRIL-10 (RRIL-10'), FSRR-50 (FSRR-50') has an image location reference region image location RRIL-50 (RRIL-50'), and so on.

As previously indicated, the image focus location or position (e.g., at the camera 360) is periodically altered by the periodic optical power variation associated with the operation of the VFL lens 370. It will be appreciated that the point conjugate to the camera image plane, that is, the reference focus position RFP in the vicinity of the reference object 488, is thus also periodically altered or swept due to the periodic optical power variation associated with the operation of the VFL lens 370. When different respective FSRRs are located at different respective reference focus positions RFP, they will thus be best-focused in respective images acquired at different respective times (designated phase times) in relation to a phase or period of the periodic optical power variation of the VFL lens 370.

Accordingly, the reference object image ROI-Ph-10 in FIG. 5A is acquired by an image exposure (e.g., a strobe timing) at a phase timing designated Ph-10 (according to a convention used herein) that provides a camera image wherein the FSRR-10 at RRIL-10 is best-focused at the reference focus position RFP-10. In this image, due to the tilt angle TA of the reference object 488 (as shown in FIG. 4) the focus of the FSRRs progressively degrades as a function of distance away from FSRR-10 and RRIL-10, and is worst in the vicinity of FSRR-90 at RRIL-90, which is at the far end of the reference object 488, and thus farthest from the image focus position. The degree focus or blur for any FSRR in an image may be determined based on determining a contrast or focus metric for that particular FSRR, according to known methods. FIGS. 5B and 5C may be understood by analogy to the previous description.

Briefly, the reference object image ROI-Ph-50 in FIG. 5B is acquired by an image exposure at a phase timing Ph-50 that provides a camera image wherein the FSRR-50 at RRIL-50 is best-focused at the reference focus position RFP-50. In this particular example, RFP-50 (shown in FIG. 4) is an example of a nominal focus position RFP-nom, which is designated to nominal focus position wherein the VFL optical power is zero. Thus, RFP-nom (e.g., RFP-50) may be in the middle of the focus range Rro, and may correspond to a nominal focal length Fref of the reference object optics configuration 487 (e.g., a lens included therein). As RFP-50 is centrally located along the reference object 488 and the focus position range Rro, the focus of the FSRRs progressively degrades in each direction away from FSRR-50 and RRIL-50, and is worst at the ends of the reference object 488. Briefly, the reference object image ROI-Ph-90 in FIG. 5C is acquired by an image exposure at a phase timing Ph-90 that provides a camera image wherein the FSRR-90 at RRIL-90 is best-focused at the reference focus position RFP-90. The focus of the FSRRs progressively degrades in the direction away from FSRR-90 and RRIL-90, and is worst in the vicinity of FSRR-10 at RRIL-10, at the far end of the reference object 488.

It should be appreciated that distributing the FSRRs along the periphery of the reference object 488 allows them to be imaged such that their respective known RRILs in reference object images are located along one or more edges of the camera image, and not in a central area of the camera image. In some such implementations, the VFL lens system 300 may be configured such that the workpiece image is located in the central area of the camera image. In some such implementations, a workpiece image and a reference object image may be exposed simultaneously in the same camera image, without using a separate timing or special wavelength filtering to prevent destruction of the workpiece image by the reference object image, or vice versa. While this configuration is particularly advantageous, it is not limiting. More generally, the VFL lens system may be configured such that the workpiece image is located in any first predetermined area of the camera image, and the respective known RRILs of the set of FSRRs are located in any second predetermined area of the camera image that is different than the first predetermined area, or the workpiece images and reference object images may be exposed at different times, and significant advantages of a focus state reference subsystem according to this disclosure may still be provided.

It should be appreciated that for the reference object 488, wherein the FSRRs are continuously distributed throughout a focus position range Rro, that any particular camera image may include a best-focused FSRR-i, if desired. As previously indicated, the VFL lens system 300 may comprise a reference region focus analyzer 384 configured to identify a best-focus image of a particular FSRR in the camera image. In this case, the reference region focus analyzer 384 may analyze all the FSRRs in a camera image and determine the FSRR-i that has the best contrast or focus metric. Importantly, that best-focused FSRR-i is directly indicative of the focus state of the VFL lens system and its effective focus position EFP for that camera image, regardless of whether the VFL lens system drifts from its nominal or desired operating state. When the camera image also includes a focused workpiece image, that EFP provides an accurate workpiece Z-height measurement regardless of whether the VFL lens system drifts from its nominal or desired operating state, as described in greater detail below with reference to FIG. 6.

Figure 5:
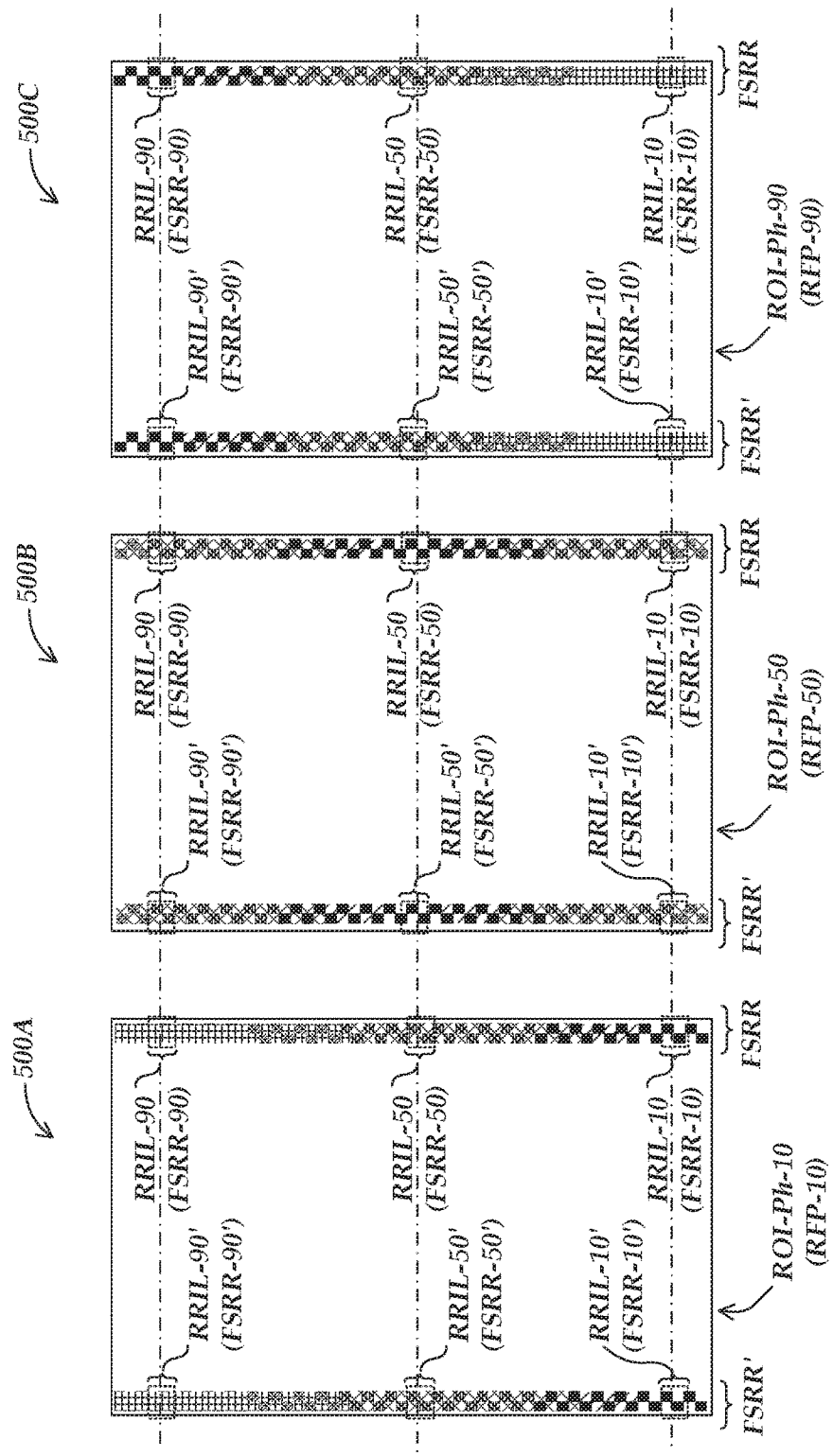
FIGS. 5A, 5B and 5C are diagrams representing three camera images that include images of the reference object of FIG. 4 in three different focus states.
Figure 6:
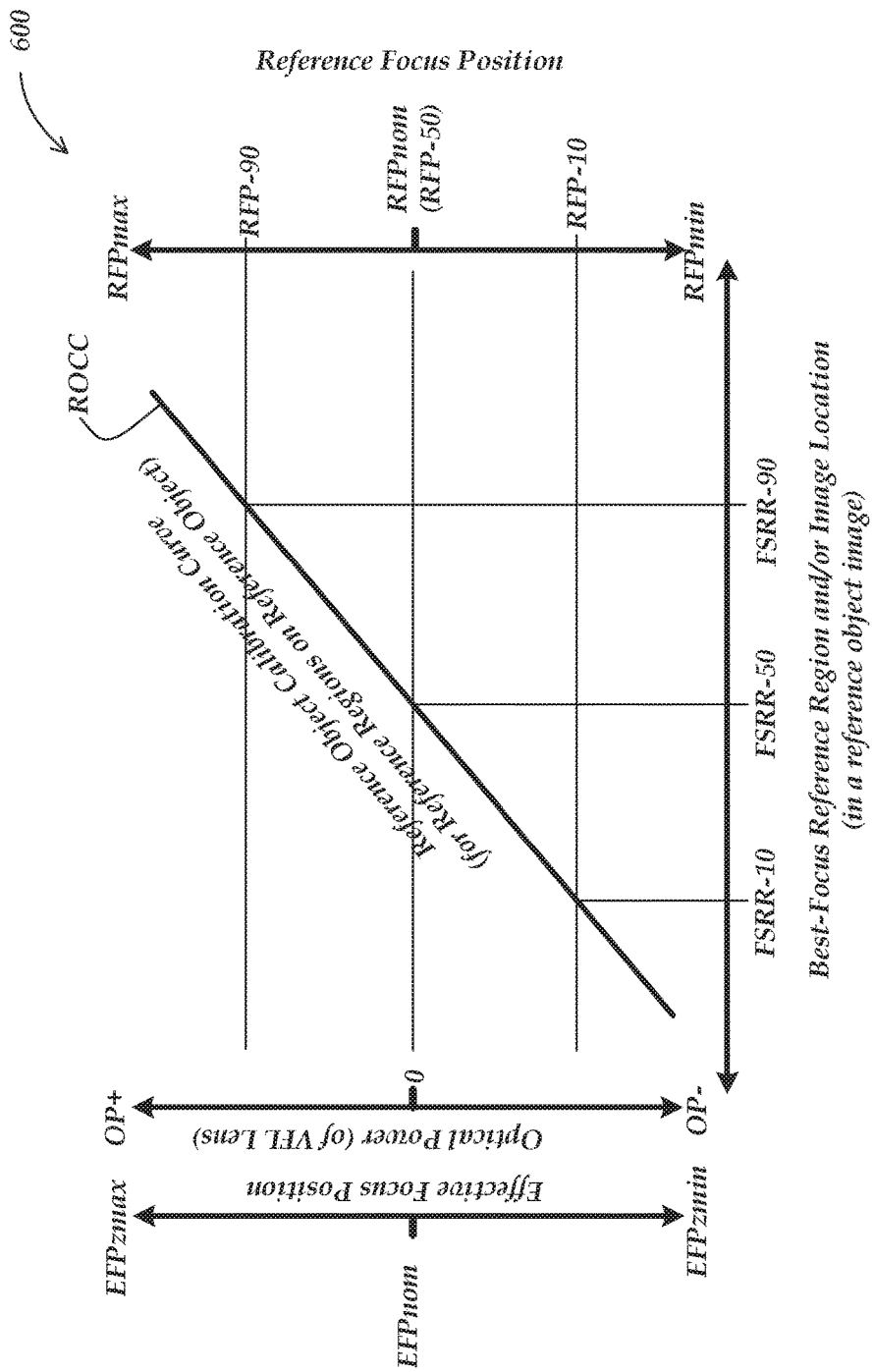
FIG. 6 is a chart representing the relationships between various focus state features or parameters associated with various "best focused" reference regions of the reference object represented in FIGS. 4 and 5, for a VFL imaging system that includes a focus state reference subsystem according to principles disclosed herein.

FIG. 6 is a chart 600 representing the relationships between various focus state features or parameters associated with various "best focused" focus state reference regions (FSRRs) of the reference object 488 shown in FIG. 4, when imaged in various images such as those represented in FIG. 5, for a VFL imaging system that includes the focus state reference subsystem 486 described above, or the like. The horizontal axis includes positions that designate various FSRRs and/or RRILs that are best-focused in any particular image. It will be understood that the three explicitly designated focus state reference regions FSRR-10, FSRR-50 and FSRR-90 (and/or their corresponding RRILs) are representative of many more individual FSRRs in the set FSRR, which may be represented along the horizontal axis.

A reference object calibration curve ROCC indicates a calibrated or known relationship between each FSRR (or its corresponding RRIL) and the corresponding reference focus position RFP shown on the vertical axis at the right side of chart 600, where it is best-focused (e.g., as indicated by a focus metric and/or or focus curve determined by the reference region focus analyzer 384). Because the reference object 488 includes a set of adjacent reference regions FSRR continuously distributed along a tilted plane as shown in FIG. 4, the reference object calibration curve ROCC is nominally a straight line, as shown. In practice, the reference object calibration curve ROCC may deviate from a straight line due to various design factors and/or imperfections, and may be established by analysis or experiment, corresponding to any particular reference object 488, reference object optics configuration 487, and VFL lens system 300.

Regarding the relationship between the three vertical axes in the chart 600, the corresponding points on each vertical axis need not be linearly related. For example, the optical power (OP) of the VFL lens is generally inversely related to its focal length, and therefore the optical power axis may have a non-linear relationship to the reference focus position axis and the effective focus position axis. Imperfections in any particular VFL lens system may also contribute to non-linearities or distortions between the various vertical axes. Nevertheless, the VFL lens is included as a "common mode" factor in the optical path OPATH for both the effective focus position and the reference focus position, and all optical components are otherwise mounted in a fixed and stable relationship to one another. Therefore, it may be considered that the three vertical axes in the chart 600 are in a fixed and stable relationship to one another. It will be understood that the effective focus position EFP in front of the objective lens (e.g., the lens 350) during an image exposure corresponds to the optical power of the VFL lens during that image exposure. Similarly, the reference focus position RFP of the reference object optics configuration (e.g., the configuration 487) during an image exposure corresponds to the optical power of the VFL lens during that image exposure.

The relationship between the axes for any single state of the optical power provided by the VFL lens (e.g., the VFL lens 370) may be determined by analysis or experiment, and may thereafter be presumed stable (at least over the short term) in various implementations. Based on the foregoing description, it will be understood that according to the chart 600, a best-focused FSRR-i in a camera image may directly indicate the focus state of the VFL lens system during that camera image, that focus state including the state of the optical power of the VFL lens 370 and the effective focus position EFP of the VFL lens system 300. When that camera image also includes a focused workpiece image, that EFP provides an accurate workpiece Z-height measurement regardless of whether the VFL lens system drifts from its nominal or desired operating state.

Figure 7:
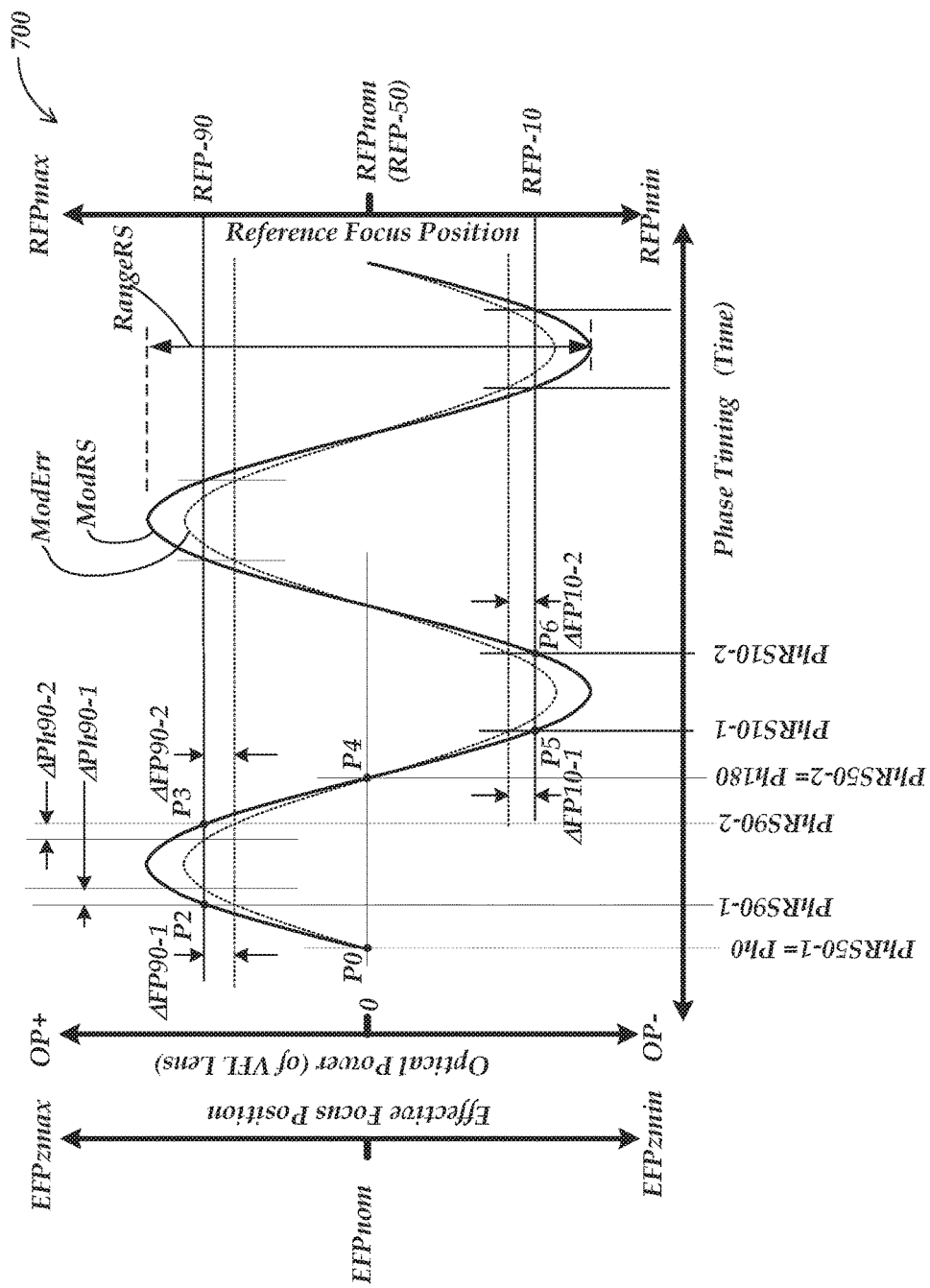
FIG. 7 is a chart representing the relationships between various focus state features or parameters associated with a periodically modulated focus state of a VFL imaging system that includes a focus state reference subsystem according to principles disclosed herein.

FIG. 7 is a chart 700 representing the relationships between various focus state features or parameters associated with a periodically modulated focus state of a VFL imaging system that includes a focus state reference subsystem according to principles disclosed herein. The horizontal axis includes positions that designate various phase timings that maybe used to acquire a particular image. It will be understood that the explicitly designated phase timings are representative of other phase timings relative to the periodic modulation of the VFL lens 370, which may be represented along the horizontal axis. The three vertical axes are the same as those shown in FIG. 6, and are in a fixed relationship to one another, as previously described.

A "reference level" modulation curve ModRS indicates a desired or reference state in which the VFL lens system is operating at a desired or calibrated "reference state", wherein the optical power of the VFL lens 370 has a "reference level" modulation amplitude of RangeRS. In the reference state corresponding to the reference level modulation curve ModRS, particular phase timings are related to particular reference focus positions RFP. For example, the phase timings PhRS50-1 and PhRS50-2 are related to RFP-50 at respective points P0 and P4 on the curve ModRS. The FSRR-50 should be best focused in such images. Similarly, the phase timings PhRS90-1 and PhRS90-2 are related to RFP-90 at respective points P2 and P3 on the curve ModRS. The FSRR-90 should be best focused in such images, and so on. Because the vertical axes are in a fixed relationship, this means that a particular phase timing used to capture a particular workpiece image is also indicative of the effective focus position of that workpiece image, provided that the VFL lens system 300 is operating in the reference state corresponding to the reference level modulation curve ModRS.

In some implementations, rather than indicating an effective focus position EFP by analyzing all FSRRs in an image and determining the best-focused FSRR-i, as outlined above with reference to FIGS. 4, 5 and 6, it may be advantageous to maintain the reference state corresponding to the reference level modulation curve ModRS, and indicate an effective focus position EFP simply based on the phase timing used to acquire an image. The reference state may be maintained based on limited number of reference object images that include best focus FSRRs at corresponding known RRILs. Drifts from the reference state generally may be due to drifts in the resonant characteristics of a VFL lens 370 (e.g., the resonant amplitude or frequency of a TAG lens, or the like), for example. If the resonant amplitude decreases to a level corresponding to the modulation curve ModErr, for example, the phase timings PhRS90-1 and PhRS90-2 will no longer correspond to RFP-90. Rather, they will correspond to $[(RFP-90)-(\Delta FP90-1)]$ and $[(RFP-90)-(\Delta FP90-2)]$, respectively. Similarly, the phase timings PhRS10-1 and PhRS10-2 will no longer correspond to RFP-10. Rather they will correspond to $[(RFP-10)-(\Delta FP10-1)]$ and $[(RFP-10)-(\Delta FP10-2)]$, respectively, and so on. It will be appreciated from the foregoing discussion that, whenever desired, the reference region focus analyzer 384 may be operated to analyze a limited number of images including different FSRRs that have corresponding known and stable FRPs and determine whether or not reference object images acquired at particular phase timings deviate from the reference state. The adjustment and/or warning circuits/routines 385 of the lens controller 380 may then be operated to adjust the drive signal amplitude (and/or frequency) of the VFL lens 370, to reestablish the reference state.

Alternatively, rather than maintaining the reference state, a relationship or transformation may be determined between the known (e.g., stored or calibrated) focus parameters of the reference state and the focus parameters of a current operating state. For example, it will be understood that it is possible to acquire reference object images of the FSRR-90 at various phase timings close to PhRS90-1 (or PhRS90-2) until a phase timing varying by $\Delta Ph90-1$ (or $\Delta Ph90-2$) produces a best focus image of FSRR-90 at RFP-90. Similar operations may be carried out in relation to other FSRRs, if desired. It will be appreciated that the reference level modulation curve ModRS (which may be previously characterized and stored) can then be transformed to fit the results corresponding to the determined values for ΔPh90-1 (and/or ΔPh90-2), and the like. The transformation can thereafter be used to determine a current relationship between the horizontal and vertical axes shown in the chart 700 (e.g., to characterize the modulation curve ModErr), which can then be used to establish the effective focus position EFP for various images based on their phase timing, and so on.

According to the description immediately above, in contrast to the reference object 488, a reference object which includes a limited number of FSRRs at a limited number of reference focus positions may be used to provide a number of benefits such as maintaining a reference focus state, or determining deviations from a reference focus state. One such reference object is described below.

Figure 8:
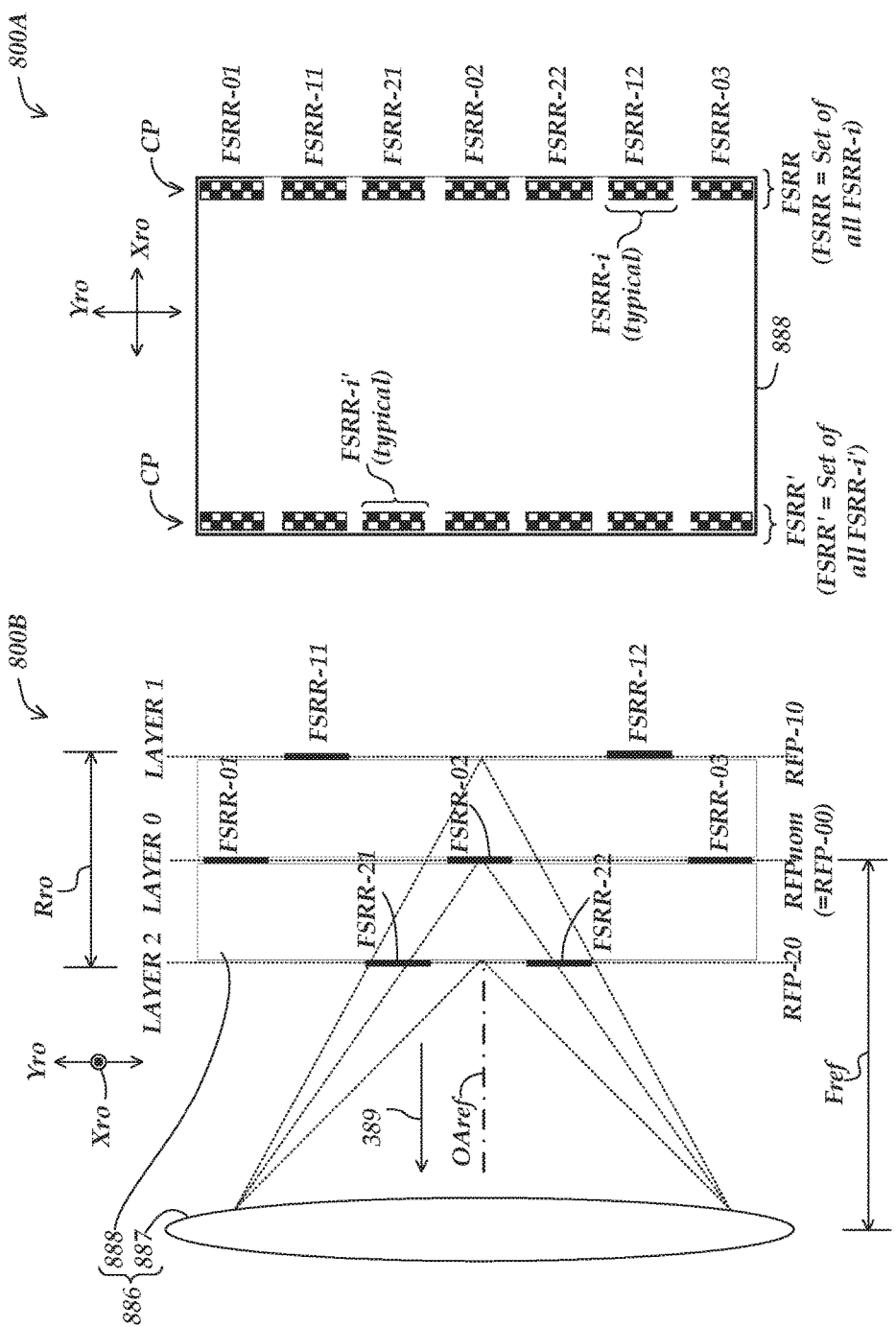
FIG. 8 is a diagram showing an implementation including a second embodiment of a reference object usable in a focus state reference subsystem according to principles disclosed herein.

FIG. 8 includes two related diagrams, similar to those shown in FIG. 4, and including similar reference number designations. Similarly numbered (e.g., 8XX and 4XX) or named elements in FIG. 8 and FIG. 4 may provide similar functions and may be understood by analogy, except as otherwise indicated below.

A second embodiment of a reference object 888 is shown in a plan view in diagram 800A. The diagram 800B is a side view diagram, wherein the reference object 888 is shown as imaged using the reference object optics configuration 887, in a second implementation of focus state reference subsystem 886, according to principles disclosed herein. The focus state reference subsystem 886 may be operated as, or substitute for, the focus state reference subsystem 386 described with reference to FIG. 3 and its operation may be understood, in part, based on the previous description.

As shown in the diagrams 800A and 800B, the reference object 888 has three planar "pattern surfaces", Layer0, Layer2, and Layer1 that include a contrast pattern CP arranged in various focus state reference regions (FSRR) at their periphery. Layer0, Layer2, and Layer1 are at different focus positions along the optical axis OAref within (and defining) the reference object focus range Rro. It will be understood that the FSRRs may optionally be included in the more or fewer areas, or may be differently sized, if desired. It will be understood that FSRRs on the same layer nominally correspond to the same RFP (e.g., FSRR-21 and FSRR-22 are both located at RFP-20, and so on), and are therefore redundant to some degree. However, such redundancy may help overcome various alignment or assembly errors, or provide other benefits, in some embodiments. It will be understood that in other implementations, two layers or more than three layers may be used, if desired.

Similar to the focus state reference subsystem 486, in the focus state reference subsystem 886 the reference object optics configuration 887 may have a focal distance Fref (e.g., of a lens included therein) along its optical axis, and the different respective FSRRs include at least one respective reference region focus distance located farther than Fref and at least one respective reference region focus distance located closer than Fref to the reference object optics configuration 887. In one exemplary implementation, Fref may be at least 30 millimeters, or at least 40 millimeters, or more. In one exemplary embodiment, Fref may be 36 millimeters, and the thickness between layers may be approximately 0.32 millimeters, and the dimensions of the reference object 888 may be approximately 1.0×1.25 millimeters along the axes Xro and Yro, respectively. Such a focus state reference subsystem 886 may be incorporated into an exemplary VFL lens system such as those described with reference to FIGS. 1-3, and imaged onto the periphery of 1280×1024 pixel camera (e.g., the camera 360) to provide a reference object image usable according to principles disclosed herein.

FIGS. 9A, 9B and 9C are diagrams representing three camera images that include images of the reference object 888 of FIG. 8 in three different focus states. In particular, FIG. 9A represents a reference object image ROI-Ph-10 focused at the reference focus position RFP-10 where FSRR-11, -11', -12, and -12' on Layer1 are best-focused; FIG. 9B represents a reference object image ROI-Ph-00 focused at the reference focus position RFP-00 where FSRR-01, -01', -02, -02', -03 and -03' on Layer0 are best-focused; and FIG. 9C represents reference object image ROI-Ph-20 focused at the reference focus position RFP-20 where FSRR-21, -21', -22, and -22' on Layer2 are best-focused. The reference focus positions RFP-10, RFP-00, RFP-20, are shown in FIG. 8.

It will be appreciated that the contrast pattern(s) CP shown in FIGS. 8 and 9 are exemplary only and not limiting. For example, the contrast patterns on various layers may be longer along the direction Yro (e.g., as illustrated in FIG. 4), but offset to one another along the direction Xro, so that they do not interfere and can be separated in a camera image. Other possible forms of the contrast pattern CP will be apparent based on the foregoing disclosure.

It will be understood the limited number of FSRRs and corresponding known reference focus positions RFP of the focus state reference subsystem 886 described above with reference to FIGS. 8 and 9 may be used to provide a number of benefits such as maintaining a reference focus state, or determining deviations from a reference focus state, as previously outlined above with reference to FIG. 7.

In various implementations outlined above, image data acquired by the camera 360 as the basis for monitoring or determining the focus state of the VFL system and may in some instances be displayed in a user interface of the imaging system 300 (e.g., see FIG. 2, display devices 136), or alternatively may not be outputted by the imaging system 300 (e.g., utilized primarily internally for determining effective focus distances and/or making adjustments, etc.).

In some implementations, a focus state reference subsystem configured according to principles outlined above may be provided as an "accessory" for use with a variable focal length (VFL) lens system that includes a VFL lens system frame or housing comprising an accessory optical port. In such an implementation, in addition to the elements outlined above, the focus state reference subsystem may comprise a reference subsystem frame or housing comprising a reference subsystem optical port configured to mount fixedly to the accessory optical port on the VFL lens system. In such implementations, the reference object optics configuration is configured such that when the reference subsystem optical port is mounted fixedly to the accessory optical port on the VFL lens system, the reference object optics configuration is arranged to input reference object light arising from the FS reference object during a reference object image exposure, and transmit the reference object light along at least a portion of the imaging optical path to pass through the VFL lens and to the camera during the reference object image exposure, to provide a reference object image in a corresponding camera image, for use as previously outlined and as described in greater detail below.

In a variation of the implementation described with reference to the tilted reference object 488, a reference object may more generally comprise at least one pattern surface which is curved, at least part of which is not perpendicular to an optical axis of the reference object optics configuration. Different portions of the at least one curved pattern surface are fixed at different respective focus distances relative to the reference object optics configuration, and the set of FSRRs are arranged on the different portions of the at least one curved pattern surface.

In some implementations, the features and principles outlined above may be used to establish a calibrated state for a VFL lens system. The calibrated state may comprise at least one member of the set of FSRRs exhibiting a particular calibrated focus characteristic value in a reference object image exposed using a corresponding particular known phase timing. The reference region focus analyzer 384 may be configured to determine the focus characteristic value for members of the set of FSRRs in reference object images exposed using corresponding particular known phase timings. In some implementations, the VFL lens controller 380 may be configured to automatically or semi-automatically operate the reference region focus analyzer 384 to adjust the drive signal of the VFL lens 370 such that the determined focus characteristic value for at least one member of the set of FSRRs in at least one reference object image exposed using a corresponding particular known phase timing matches the particular calibrated focus characteristic value for that at least one member of the set of FSRRs at that corresponding particular known phase timing. In some implementations, the VFL lens system may be configured to automatically or semi-automatically operate the reference region focus analyzer 384 and provide a warning indicator when the determined focus characteristic value for at least one member of the set of FSRRs in at least one reference object image exposed using a corresponding particular known phase timing does not match the particular calibrated focus characteristic value for that at least one member of the set of FSRRs at that corresponding particular known phase timing.

In some implementations that include a calibrated state as outlined above, the determined focus characteristic value for a member of the set of FSRRs may comprise the value of a quantitative contrast metric that is based on reference object image data corresponding to the known RRIL of that member of the set of FSRRs. In some such implementations, the reference region focus analyzer 384 may comprise a set of operations implemented by a software routine in a remote computer, wherein the remote computer is configured to receive reference object image data from the VFL system and perform the set of operations to determine the value of the quantitative contrast metric based on the reference object image data corresponding to the known RRIL of that member of the set of FSRRs.

While preferred implementations of the present disclosure have been illustrated and described, numerous variations in the illustrated and described arrangements of features and sequences of operations will be apparent to one skilled in the art based on this disclosure. Various alternative forms may be used to implement the principles disclosed herein. For example, a multi-layer reference object similar to that described with reference to FIGS. 8 and 9, but including only two layers, may be used in various implementations. In addition, the various implementations described above can be combined to provide further implementations. For example, a tilted reference object may be implemented using an adjustable tilting mechanism, so that the reference object focus position range Rro covered by the tilted reference object may be adjusted to correspond to a particular objective lens, or to increase the focus distance selectivity or resolution associated with various focus state reference region locations, or the like. As another example, a multi-layer reference object may be tilted to provide a combination of the benefits associated with each of a multi-layer reference object and a tilted reference object. All of the U.S. patents and U.S. patent applications referred to in this specification are incorporated herein by reference, in their entirety. Aspects of the implementations can be modified, if necessary to employ concepts of the various patents and applications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled.

The invention claimed is:

1. A variable focal length (VFL) lens system, comprising:
a VFL lens;
a VFL lens controller that controls a drive signal of the VFL lens to periodically modulate optical power of the VFL lens over a range of optical powers that occur at respective phase timings within the periodic modulation;
a camera that receives light transmitted along an imaging optical path through the VFL lens during an image exposure and provides a corresponding camera image;
an objective lens that inputs workpiece light arising from a workpiece during a workpiece image exposure and transmits the workpiece light along the imaging optical path through the VFL lens and to the camera during the workpiece image exposure, to provide a workpiece image in a corresponding camera image, wherein an effective focus position in front of the objective lens during a workpiece image exposure corresponds to the optical power of the VFL lens during that workpiece image exposure; and
an exposure time controller configured to control an image exposure timing used for a camera image,
wherein:
the VFL lens system further comprises a focus state reference subsystem comprising at least a focus state (FS) reference object and a reference object optics configuration;
the reference object optics configuration is arranged to input reference object light arising from the FS reference object during a reference object image exposure, and transmit the reference object light along at least a portion of the imaging optical path to pass through the VFL lens and to the camera during the reference object image exposure, to provide a reference object image in a corresponding camera image; and
the FS reference object comprises a set of focus state (FS) reference regions that include a contrast pattern and that have respective known reference region image locations in the reference object images and that are fixed at different respective reference region focus positions relative to the reference object optics configuration, wherein a camera image that includes a best-focus image of a particular FS reference region defines a system focus reference state associated with that particular FS reference region, and that defined system focus reference state comprises at least one of a particular VFL optical power or a particular effective focus position associated with that particular FS reference region.

2. The VFL lens system of claim 1, wherein the FS reference object comprises a plurality of planar pattern surfaces fixed at different respective focus distances relative to the reference object optics configuration along an optical axis of the reference object optics configuration, and the set of FS reference regions are arranged on the plurality of planar pattern surfaces.

3. The VFL lens system of claim 1, wherein the FS reference object comprises at least one pattern surface, at least part of which is not perpendicular to an optical axis of the reference object optics configuration, such that different portions of the at least one pattern surface are fixed at different respective focus distances relative to the reference object optics configuration, and the set of FS reference regions are arranged on the different portions of the at least one pattern surface.

4. The VFL lens system of claim 3, wherein the at least one pattern surface comprises a planar pattern surface that is not normal to the optical axis of the reference object optics configuration, and the set of FS reference regions comprise different portions of a contrast pattern that extends along the planar pattern surface that is not normal to the optical axis of the reference object optics configuration.

5. The VFL lens system of claim 1, wherein the reference object optics configuration comprises a reference object imaging lens having a focal distance Fref along an optical axis of the reference object optics configuration, and the different respective reference region focus positions include at least one respective reference region focus position located farther than Fref from the reference object imaging lens and at least one respective reference region focus position located closer than Fref to the reference object imaging lens.

6. The VFL lens system of claim 5, wherein Fref is at least 30 millimeters.

7. The VFL lens system of claim 1, wherein the set of FS reference regions are configured on the FS reference object such that their respective known reference region image locations in the reference object images are located along one or more edges of the camera image, and not in a central area of the camera image.

8. The VFL lens system of claim 7, wherein the VFL lens system is configured such that the workpiece image is located in the central area of the camera image.

9. The VFL lens system of claim 1, wherein the VFL lens system is configured such that the workpiece image is located in a first predetermined area of the camera image, and the respective known reference region image locations of the set of FS reference regions are located in a second predetermined area of the camera image that is different than the first predetermined area, and the workpiece image and the reference object image are exposed simultaneously in the same camera image.

10. The VFL lens system of claim 9, wherein the VFL lens system comprises a reference region focus analyzer configured to identify the best-focus image of the particular FS reference region in the camera image, and identify the particular effective focus position associated with that particular FS reference region as an effective focus position of the workpiece image in the same camera image.

11. The VFL lens system of claim 1, wherein:
a calibrated state of the VFL lens system comprises at least one member of the set of FS reference regions exhibiting a particular calibrated focus characteristic value in a reference object image exposed using a corresponding particular known phase timing;
the VFL lens system comprises a reference region focus analyzer configured to determine the focus characteristic value for members of the set of FS reference regions in reference object images exposed using corresponding particular known phase timings, and
the VFL lens controller is configured to automatically or semi-automatically operate the reference region focus analyzer and adjust the drive signal of the VFL lens such that the determined focus characteristic value for at least one member of the set of FS reference regions in at least one reference object image exposed using a corresponding particular known phase timing matches the particular calibrated focus characteristic value for that at least one member of the set of FS reference regions at that corresponding particular known phase timing.

12. The VFL lens system of claim 11, wherein the determined focus characteristic value for a member of the set of FS reference regions comprises a value of a quantitative contrast metric that is based on reference object image data corresponding to the known reference region image location of that member of the set of FS reference regions.

13. The VFL lens system of claim 12, wherein the reference region focus analyzer comprises a set of operations implemented by a software routine in a remote computer, the remote computer configured to receive the reference object image data from the VFL lens system and perform the set of operations to determine the value of the quantitative contrast metric based on the reference object image data corresponding to the known reference region image location of that member of the set of FS reference regions.

14. The VFL lens system of claim 1, wherein;
the VFL lens system comprises a workpiece strobe light source configured to provide illumination to the workpiece during the workpiece image exposure; and
the exposure time controller is configured to control a timing of the workpiece image exposure by controlling a strobe timing of the workpiece strobe light source.

15. The VFL lens system of claim 14, wherein;
the VFL lens system comprises a reference object strobe light source configured to provide illumination to the FS reference object during the reference object image exposure; and
the exposure time controller is configured to control a timing of the reference object image exposure by controlling a strobe timing of the reference object strobe light source.

16. The VFL lens system of claim 15, wherein the workpiece strobe light source and the reference object strobe light source are the same light source, the timing of the workpiece image exposure and the timing of the reference object image exposure are simultaneous, and the workpiece image and the reference object image are included in the same camera image.

17. The VFL lens system of claim 15, wherein the workpiece strobe light source and the reference object strobe light source are different light sources, the timing of the workpiece image exposure and the timing of the reference object image exposure are different, and the workpiece image and the reference object image are included in different camera images.

18. The VFL lens system of claim 1, wherein:
a calibrated state of the VFL lens system comprises at least one member of the set of FS reference regions exhibiting a particular calibrated focus characteristic value in a reference object image exposed using a corresponding particular known phase timing;

the VFL lens system comprises a reference region focus analyzer configured to determine the focus characteristic value for at least one member of the set of FS reference regions in reference object images exposed using corresponding particular known phase timings, and the VFL lens system is configured to automatically or semi-automatically operate the reference region focus analyzer and provide a warning indicator when the determined focus characteristic value for at least one member of the set of FS reference regions in at least one reference object image exposed using a corresponding particular known phase timing does not match the particular calibrated focus characteristic value for that at least one member of the set of FS reference regions at that corresponding particular known phase timing.

19. A focus state reference subsystem for use in a variable focal length (VFL) lens system, wherein:

the VFL lens system comprises:

a VFL lens;

a VFL lens controller that controls a drive signal of the VFL lens to periodically modulate optical power of the VFL lens over a range of optical powers that occur at respective phase timings within the periodic modulation;

a camera that receives light transmitted along an imaging optical path through the VFL lens during an image exposure and provides a corresponding camera image;

an objective lens that inputs workpiece light arising from a workpiece during a workpiece image exposure and transmits the workpiece light along the imaging optical path through the VFL lens and to the camera during the workpiece image exposure, to provide a workpiece image in a corresponding camera image, wherein an effective focus position in front of the objective lens during a workpiece image exposure corresponds to the optical power of the VFL lens during that workpiece image exposure;

an exposure time controller configured to control an image exposure timing used for a camera image; and a VFL lens system frame or housing comprising an accessory optical port, and the focus state reference subsystem comprises at least a focus state (FS) reference object, a reference object optics configuration, and a reference subsystem frame or housing comprising a reference subsystem optical port, wherein;

the reference subsystem optical port is configured to mount fixedly to the accessory optical port on the VFL lens system;

the reference object optics configuration is configured such that when the reference subsystem optical port is mounted fixedly to the accessory optical port on the VFL lens system, the reference object optics configuration is arranged to input reference object light arising from the FS reference object during a reference object image exposure, and transmit the reference object light along at least a portion of the imaging optical path to pass through the VFL lens and to the camera during the reference object image exposure, to provide a reference object image in a corresponding camera image; and the FS reference object comprises a set of focus state (FS) reference regions that include a contrast pattern and that have respective known reference region image locations in the reference object images and that are fixed at different respective reference region focus positions relative to the reference object optics configuration, wherein a camera image that includes a best-focus image of a particular FS reference region defines a system focus reference state associated with that particular FS reference region, and that system focus reference state comprises at least one of a particular VFL optical power or a particular effective focus position associated with that particular FS reference region.

* * * * *